United States Patent [19]
Ichikawa et al.

[11] Patent Number: 5,845,148
[45] Date of Patent: Dec. 1, 1998

[54] HIERARCHICAL PROCESSING SYSTEM AND METHOD FOR DOWN LOADING INFORMATION IN PARALLEL

[75] Inventors: Tamotsu Ichikawa; Masao Komatsu, both of Kanagawa, Japan

[73] Assignee: Fujitsu Limited, Kanagawa, Japan

[21] Appl. No.: 847,532

[22] Filed: Apr. 24, 1997

Related U.S. Application Data

[63] Continuation of Ser. No. 302,526, Sep. 8, 1994, abandoned.

[30] Foreign Application Priority Data

Mar. 16, 1994 [JP] Japan .................................... 6-046189

[51] Int. Cl.6 .................................................... G06F 13/00
[52] U.S. Cl. .................. 395/828; 395/200.5; 395/200.31
[58] Field of Search ..................................... 395/800, 821, 395/828–830, 200.8, 200.31; 364/146

[56] References Cited

U.S. PATENT DOCUMENTS

| | | | |
|---|---|---|---|
| 4,760,525 | 7/1988 | Webb ....................................... | 395/800 |
| 4,853,875 | 8/1989 | Brown ...................................... | 364/514 |
| 4,972,365 | 11/1990 | Dodds et al. ........................... | 395/825 |
| 5,162,986 | 11/1992 | Graber et al. ........................... | 364/146 |
| 5,416,831 | 5/1995 | Chewning, III et al. ................. | 379/96 |

FOREIGN PATENT DOCUMENTS

| | | |
|---|---|---|
| 61-288245 | 12/1986 | Japan . |
| 62-19960 | 1/1987 | Japan . |
| 63-178358 | 7/1988 | Japan . |
| 1-194054 | 8/1989 | Japan . |

*Primary Examiner*—Christopher B. Shin
*Attorney, Agent, or Firm*—Helfgott & Karas, P.C.

[57] ABSTRACT

A hierarchical processing system includes processors connected in a hierarchical formation having first, second and third hierarchical levels, for down loading information to the processors in parallel. The system comprises a memory unit provided at the first hierarchical level, for storing information to be down loaded to the processors located at the second and third hierarchical levels and for receiving configuration data about the processors located at the second and third hierarchical levels therefrom, a receiving unit provided at the second hierarchical level, for receiving the information to be down loaded to the processors located at the second and third hierarchical levels from the memory unit and for sending the configuration data about processors located at the second and third hierarchical levels to the memory unit. Another receiving unit is provided at the third hierarchical level, for receiving the information to be down loaded to the processors located at the third hierarchical level from the memory unit via the first receiving unit and for sending the configuration data about the processors located at the third hierarchical level to the first receiving unit. Thus, the memory unit can store the information to be down loaded to the processors and send the information to the processors on the basis of the configuration data.

14 Claims, 19 Drawing Sheets

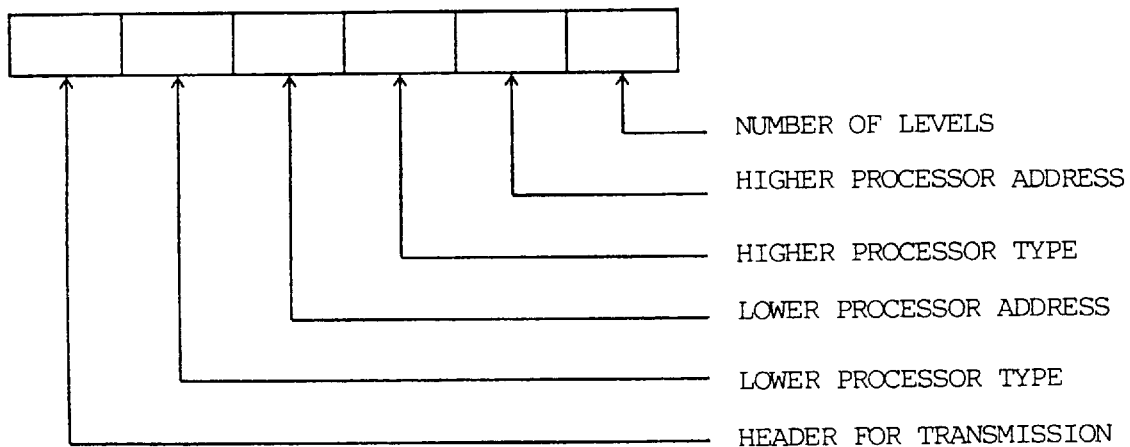

FIG. 7

| NUMBER OF LEVELS | LOWER PROCESSOR TYPE | LOWER PROCESSOR ADDRESS | HIGHER PROCESSOR TYPE | HIGHER PROCESSOR ADDRESS | |
|---|---|---|---|---|---|
| 1 | 2 | 2 1 | 1 | 1 1 | ⎫ |
| 2 | 4 | 4 1 | 2 | 2 1 | ⎬ BLOCK-1 |
| 2 | 6 | 6 1 | 2 | 2 1 | ⎭ |
| 1 | 3 | 3 1 | 1 | 1 1 | ⎫ |
| 2 | 5 | 5 1 | 3 | 3 1 | ⎬ BLOCK-2 |
| 2 | 7 | 7 1 | 3 | 3 1 | ⎭ |

FIG. 8A

| NUMBER OF LEVELS | LOWER PROCESSOR TYPE | LOWER PROCESSOR ADDRESS | HIGHER PROCESSOR TYPE | HIGHER PROCESSOR ADDRESS |
|---|---|---|---|---|
| 1 | 4 | 4 1 | 2 | 2 1 |
| 1 | 6 | 6 1 | 2 | 2 1 |

FIG. 8B

| NUMBER OF LEVELS | LOWER PROCESSOR TYPE | LOWER PROCESSOR ADDRESS | HIGHER PROCESSOR TYPE | HIGHER PROCESSOR ADDRESS |
|---|---|---|---|---|
| 1 | 5 | 5 1 | 3 | 3 1 |
| 1 | 7 | 7 1 | 3 | 3 1 |

| NUMBER OF LEVELS | PATH NUMBER | LOWER PROCESSOR TYPE | LOWER PROCESSOR ADDRESS | HIGHER PROCESSOR TYPE | HIGHER PROCESSOR ADDRESS | |
|---|---|---|---|---|---|---|
| 1 | 1 | 2 | 21 | 1 | 11 | ⎫ |
| 2 | 1 | 4 | 41 | 2 | 21 | ⎬ BLOCK 1 |
| 2 | 2 | 4 | 42 | 2 | 21 | ⎭ |
| 1 | 1 | 3 | 31 | 1 | 11 | ⎫ |
| 2 | 1 | 5 | 51 | 3 | 31 | ⎬ BLOCK 2 |
| 2 | 2 | 5 | 52 | 3 | 31 | ⎭ |

FIG. 14

| NUMBER OF LEVELS | PATH NUMBER | LOWER PROCESSOR TYPE | LOWER PROCESSOR ADDRESS | HIGHER PROCESSOR TYPE | HIGHER PROCESSOR ADDRESS |
|---|---|---|---|---|---|
| 1 | 1 | 4 | 41 | 2 | 21 |
| 1 | 2 | 4 | 42 | 2 | 21 |

FIG. 15A

| NUMBER OF LEVELS | PATH NUMBER | LOWER PROCESSOR TYPE | LOWER PROCESSOR ADDRESS | HIGHER PROCESSOR TYPE | HIGHER PROCESSOR ADDRESS |
|---|---|---|---|---|---|
| 1 | 1 | 5 | 51 | 3 | 31 |
| 1 | 2 | 5 | 52 | 3 | 31 |

| LOWER PROCESSOR TYPE | NUMBER OF LOWER PROCESSORS | LOWER PROCESSOR ADDRESS | |
|---|---|---|---|
| 4 | 2 | 4 1 | 4 2 |

FIG. 17B

| LOWER PROCESSOR TYPE | NUMBER OF LOWER PROCESSORS | LOWER PROCESSOR ADDRESS | |
|---|---|---|---|
| 5 | 2 | 5 1 | 5 2 |

HIERARCHICAL PROCESSING SYSTEM AND METHOD FOR DOWN LOADING INFORMATION IN PARALLEL

This is a continuation of application Ser. No. 08/302,526, filed Sep. 8, 1994, abandoned.

BACKGROUND OF THE INVENTION

(1) Field of the Invention

The present invention relates to a hierarchical processing system, including processors connected in a hierarchical formation, for down loading information to the processors, and more particularly, relates to a distributed hierarchical processing system for carrying out an initial program load sequence. The present invention also relates to a method for down loading the information in parallel to the processors connected in the hierarchical formation.

(2) Description of the Prior Art

Recently, various information processing systems have been required to process complicated, integrated and mass information. An information processing system comprising a single processor capable of processing such information is not known in the art. To this end, a processing system comprising multiple processors has been introduced. In order to process such information in the multiple processors, a procedure for processing such information must be divided into several processing tasks and each of processing tasks is, for example, assigned to each of processors in the distributed hierarchical processing system. A processing unit, such as the processor, included in the distributed hierarchical processing system should be supplied with information, such as programs, corresponding to each of the tasks applied to the unit so that the unit could carry out the tasks.

A conventional method for supplying the programs to each of the processors is to allocate and store the programs, corresponding to the tasks applied to the processor, in the processor before the processor is started. The allocated programs are stored, for example, in a ROM (read-only-memory). Each of the processors can start with an execution of the respective program stored in the ROM.

Another conventional well known method for supplying programs to the processor is to allow the processor to derive the programs corresponding to the tasks from another processor on power up. This method is referred to as an IPL (initial program loading) method. In this way, one processor retains the programs to be executed by another processor located at a lower hierarchical level than that of the one processor. Hereinafter, the one processor located at the higher hierarchical level is referred to as a higher processor and the another processor located at the lower hierarchical level is referred to as a lower processor. The programs to be executed by the lower processor are down loaded from the higher processor to the lower processor.

For example, a well known IPL method is described in Japanese Patent Application No. 61-288245, entitled "A system for controlling an initial program load". In this disclosure, a system, for down loading information, comprises processors connected to a bus and the information is down loaded to the processors by IPL. In addition, the information to be down loaded is formed of two types of files, such as a file common to all of the processors and an individual file for each processor. The common file is down loaded to all of the processors in the system or a group of special processors, and one of the individual files is down loaded to each one of the processors, respectively. The common file is attached with an IPL control command file specifying processors to which the common file should be down loaded. The IPL control command file enables the common file to be successively down loaded from the higher processor to the lower processor. Therefore, down loading of the common file through the system is executed sequentially from one processor located at the highest hierarchical level, i.e. the highest processor, to other processors located at the lower hierarchical level, i.e. the lower processors. On the contrary, each of the individual files is down loaded from the highest processor directly to each of processors via the bus to which all processors are connected.

Another well known IPL method is described in Japanese Patent Application No. 62-19960, entitled "A multistage processing system". In this way, a system comprises a transmitting processor for storing and transmitting programs and a plurality of processors to which the programs are down loaded. The plurality of processors are divided into intermediate-level processors and low-level processors. The intermediate-level processor is connected to the program transmitting processor and other intermediate-level processors or low-level processors. First, the intermediate-level processor establishes a communication with the transmitting processor in order to receive the programs, and cuts off the communication after receiving the programs from the transmitting processor. Subsequently, the intermediate-level processor establishes a communication with a lower processor, such as the intermediate-level processor or the low-level processor, in order to start the lower processor. The lower processor started by the higher processor is also connected to the transmitting processor so that the lower processor establishes a communication with the transmitting processor and receives the programs from the transmitting processor. After receiving the programs, the lower processor cuts off the communication. This procedure is repeated until the lowest processor receives the programs from the transmitting processor. Thus, all of the processors can be down loaded with the programs.

Still another well known IPL method is described in Japanese Patent Application No. 63-178358, entitled "A system for down loading information". In this way, information is sent from a higher processor to a lower processor. The higher processor sends a control command requested by the lower processor before the information is down loaded. This enables the lower processor to receive the control command for down loading the information from the higher processor to avoid the control command being generated by the lower processor. Therefore, time used for starting up the system is reduced and the control command for down loading the information can be managed solely by the highest processor.

Furthermore, a conventional IPL method described in Japanese Patent Application No. 1-194054, entitled "A distributed processing system for down loading information", is also well known. In this way, a processing system comprises a plurality of processors connected to a communication network. One processor monitors a running program at the processor and outputs data about the processor's status via the network to other processors. After receiving the output data from the one processor, another processor sends an appropriate program to the one processor via the network, when it is found that the one processor requires the program to be sent on the basis of the received data.

However, the following problems may occur in the above-mentioned conventional systems for down loading information to each of processors in the distributed hierarchical processing system.

In the conventional distributed hierarchical processing system, prior-data such as a program used for down loading information is required to be provided to each of the processors. Thus, the prior-data provided to each of the processors should be replaced with new prior-data when the previous prior-data should be modified. Therefore, it is a problem that such modifications of the prior-data for maintaining the system result in wasting time and increase costs.

In addition, in the conventional method described in the above cited reference, "A system for controlling an initial program load", the IPL control command file should be previously created before a run-time process for an initial program load starts. Therefore, it is a problem that modifications of the control command on down loading information could not be achieved on run-time. And the system also has a problem that modifications of the system architecture are not easily achieved because the highest processor should be connected to all other processors in the system so as to send the individual file directly to each of other processors.

In the conventional method described in the above cited reference, "A multistage processing system", the system comprises a plurality of processors connected in series. Therefore, it is a problem that a method for down loading information according to the cited reference is not applicable to a general hierarchical processing system. And a disadvantage occurs that programs can not be down loaded in parallel to several processors because the processors communicate with each other successively in serial.

In the conventional method described in the above cited reference, "A system for down loading information", the highest processor is required to create a control command for down loading information before starting up other processors in the system. Therefore, this system has a disadvantage that modifications of the system architecture are not easily achieved.

In the conventional method described in the above cited reference, "A distributed processing system for down loading information", the processors are required to be connected to the same common network. Therefore, it is a problem that the method for down loading information described in the cited reference is not applicable to a processing system based on a hierarchical architecture.

SUMMARY OF THE INVENTION

Accordingly, it is a general object of the present invention to provide a novel and useful hierarchical processing system, including processors connected in a hierarchical formation, and method for down loading information in which data used for down loading the information can be managed by one of the processors and is not required to be stored in other processors before the system starts down loading the information.

Another object of the present invention is to provide a hierarchical processing system for down loading information in which the information is down loaded in parallel from higher processors located at higher hierarchical levels to lower processors located at the lower hierarchical levels.

Still another object of the present invention is to provide a hierarchical processing system for down loading information in which neither the number of hierarchical levels formed in the system nor paths used for down loading the information between processors are theoretically limited.

A further object of the present invention is to provide a hierarchical processing system for down loading information in which processing time wasted in down loading the information can be reduced.

The above-mentioned objects of the present invention are achieved by a hierarchical processing system including processors connected in a hierarchical formation having first, second and third hierarchical levels, said hierarchical processing system comprising: a first-level processor, provided at the first hierarchical level, for storing information to be down loaded to the processors located at the second and third hierarchical levels and for receiving configuration data about the processors located at the second and third hierarchical levels therefrom; second-level processors, provided at the second hierarchical level, for receiving the information to be down loaded to the processors located at the second and third hierarchical levels from the first-level processor and for sending the configuration data about processors located at the second and third hierarchical levels to the first-level processor; and third-level processors, provided at the third hierarchical level, for receiving the information to be down loaded to the processors located at the third hierarchical level from the first-level processor via the second-level processor and for sending the configuration data about the processors located at the third hierarchical level to the second-level processor.

Accordingly, the first-level processor can store the information to be down loaded to the second-level and third-level processors and send the information to the processors on the basis of the configuration data received on running time. Since the whole data used for down loading the information to the processors, such as paths used for transferring the information, are stored in and managed by the first-level processor, a control command, for example, used for down loading the information is not required to be input from an input device.

In addition, since whole information to be down loaded to the processors is stored only in the first-level processor, modifying the information, for example, exchanging of ROMs for storing the information, is easily accomplished. Thus, this centralization of the information to be down loaded to the processors enables time and costs used for modifying the data to be substantially reduced.

Furthermore, the prior-data used for adequately down loading the information to processors, such as the configuration data, are generated by each of the processors and reported to the first-level processor on running time. Therefore, modifications of the system architecture, such as adding new processors or deleting the processors in the second and third hierarchical levels, do not affect the operation of other processors in the system.

The hierarchical processing system of the present invention is characterized in that the first-level processor further comprises: first-level controller for sending the stored information to the second-level processors on the basis of the stored configuration data about the second-level and third-level processors, wherein the configuration data represents a type and an address for each of the second-level and third-level processors. And the first-level controller adds a destination label to the information to be down loaded to the second-level and third-level processors, the destination label specifying the processor to be down loaded thereto. The second-level controller determines whether the information received from the first-level control means should be loaded in the second-level processor on the basis of the destination label added to the information. The third-level controller determines whether the information received from the second means should be loaded in the third-level processor on the basis of the destination label added to the information.

Accordingly, the hierarchical processing system according to the present invention can control a flow of the information to be down loaded using the destination label added onto the information to be down loaded to the processors. Because of this destination label added onto the information, the hierarchical processing system is not required to use a special data, transmitted from the first means to the processors located at the second and third hierarchical levels, for controlling a down load process.

The hierarchical processing system for down loading the information in parallel according to the present invention is characterized in that the first-level controller successively selects the processor located at the hierarchical level as low as possible such that the information is down loaded to the selected processor on the basis of the configuration data about the second-level and third-level processors.

Thus, the first-level processor can send the information to be down loaded to the different processors successively and several information addressed to the different processors are present at once in the system. Therefore, a transmission from the first-level processor to one second-level processor and another transmission from another second-level processor to one third-level processor can be carried out at once. This allows the hierarchical processing system to down load the information to the processors in parallel. Therefore, this can save wasted time for down loading the information.

Furthermore, according to the hierarchical processing system of the present invention, the first-level processor can send the information to the third-level processor not directly but via the second-level processors and the third-level processors can send the configuration data to the first-level processor via the second-level processors. Therefore, the first-level processor is not required to be connected to all other processors in the system and this causes flexible connections between the processors in the system. In addition, the information is down loaded to any processors in the system even when the system has a distributed hierarchical architecture as well as a simple hierarchical architecture. In such a distributed system it is an advantage that a plurality of second-level processors can down load the information directly to a plurality of third-level processors in parallel.

According to the present invention, the structure of the processing system and the addresses for sending the information are represented in the configuration data. Therefore, it is an advantage that modifying the system architecture such as adding new processors in the system or removing some processors from the system are easily accomplished and can be executed in run-time.

BRIEF DESCRIPTION OF THE DRAWINGS

The above and other objects, features, and advantages of the present invention will be more apparent from the following detailed description when read in conjunction with the accompanying drawings, in which:

FIG. 4 illustrates a record format for representing a configuration data according to the first embodiment of the present invention;

FIG. 5A illustrates a modification of a record for representing a configuration data according to the first embodiment of the present invention;

FIG. 5B illustrates a modification of a record for representing a configuration data according to the first embodiment of the present invention;

FIG. 5C illustrates a modification of a record for representing a configuration data according to the first embodiment of the present invention;

FIG. 7 shows a system configuration data table according to the first embodiment of the present invention;

FIG. 8A shows a block configuration data table according to the first embodiment of the present invention;

FIG. 8B shows a block configuration data table according to the first embodiment of the present invention;

FIG. 14 shows a system configuration data table according to the second embodiment of the present application;

FIG. 15A shows a block configuration data table according to the second embodiment of the present invention;

FIG. 15B shows a block configuration data table according to the second embodiment of the present invention;

FIG. 17A shows a block configuration data table according to a third embodiment of the present invention;

FIG. 17B shows a block configuration data table according to a third embodiment of the present invention;

DESCRIPTION OF THE PREFERRED EMBODIMENTS

Figure 1:
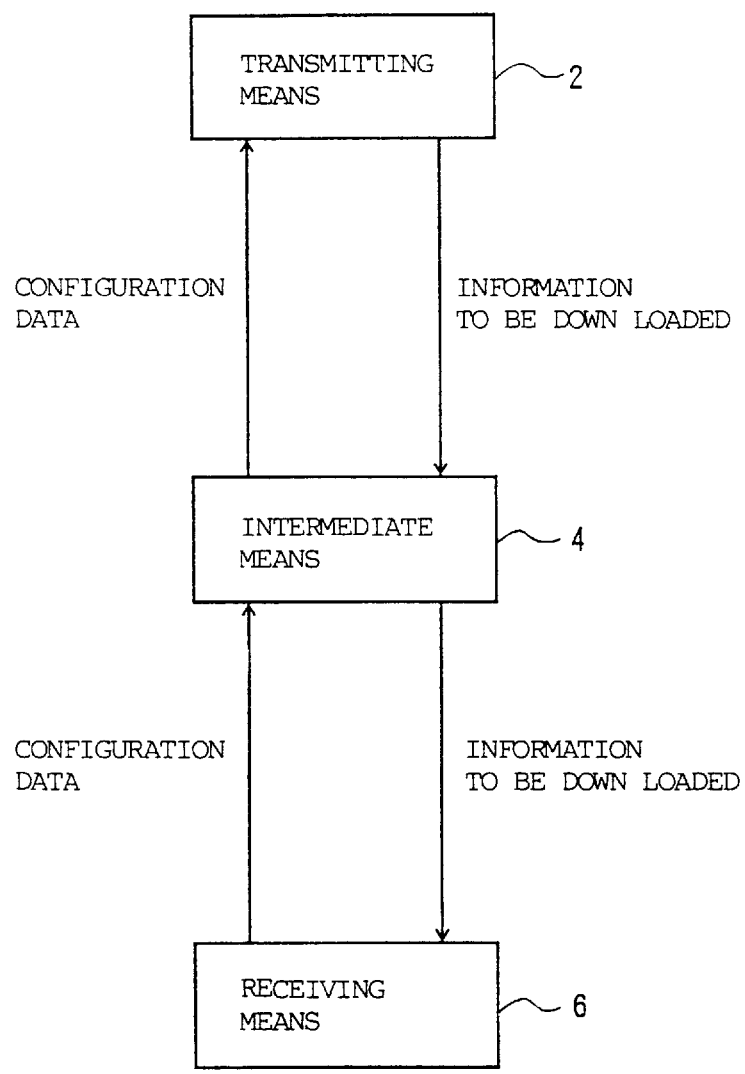
FIG. 1 is a schematic illustration for explaining a principle of the present invention.

A description will be given, with reference to FIG. 1, of the principle of a hierarchical processing system for down loading information to processors according to the present invention. The processors in the hierarchical processing system are connected in a hierarchical formation having high, intermediate and low hierarchical levels. The hierarchical processing system comprises a transmitting means 2 located at the high hierarchical level, an intermediate means 4 located at the intermediate hierarchical level and a receiving means 6 located at the low hierarchical level. The transmitting means 2 can be provided within a processor, located at the high hierarchical level, referred to as a high-level processor. The intermediate means 4 also can be provided within processors, located at the intermediate hierarchical level, referred to as intermediate-level processors and the receiving means 6 can be provided within processors, located at the low hierarchical level, referred to as low-level processors. The high-level processor is connected to the intermediate-level processors and the intermediate-level processor is connected to the low-level processors.

The information is down loaded to the intermediate-level processors and the low-level processors as follows. The transmitting means 2 stores the information to be down loaded to the processors in a memory and sends the information to the intermediate means 4. The intermediate means 4 sends the information received from the transmitting means 2 to the receiving means 6. Then the receiving means 6 receives the information from the transmitting means 2 via the intermediate means 4 so that the information is down loaded to the receiving means 6.

However, in order to transfer the information to the correct processors, prior-data such as a path used for transmitting the information should be known before transmitting the information. In the present invention, the path is determined on the basis of configuration data representing the hierarchical formation of the processors installed in the system. The configuration data is, for example, formed of a processor type and a network address for the processor, and a path for transmitting the information. The path may often be represented by the processors at the both ends of the path.

The configuration data is transferred from the receiving means 6 to the transmitting means 2 in the opposite direction of down loading the data.

First, the receiving means 6 sends the configuration data about the receiving means 6 to the intermediate means 4. Then, after receiving the configuration data from the receiving means 6, the intermediate means 4 adds the configuration data about the intermediate means 4 onto the received configuration data and sends the added configuration data to the transmitting means 2. Finally, after receiving the configuration data from the intermediate means 4, the transmitting means 2 compiles the configuration data about all the processors installed in the system or a system configuration data table.

The transmitting means 2 can select appropriate processors on the basis of the system configuration data table so that the information is down loaded to the selected processors.

Figure 2:
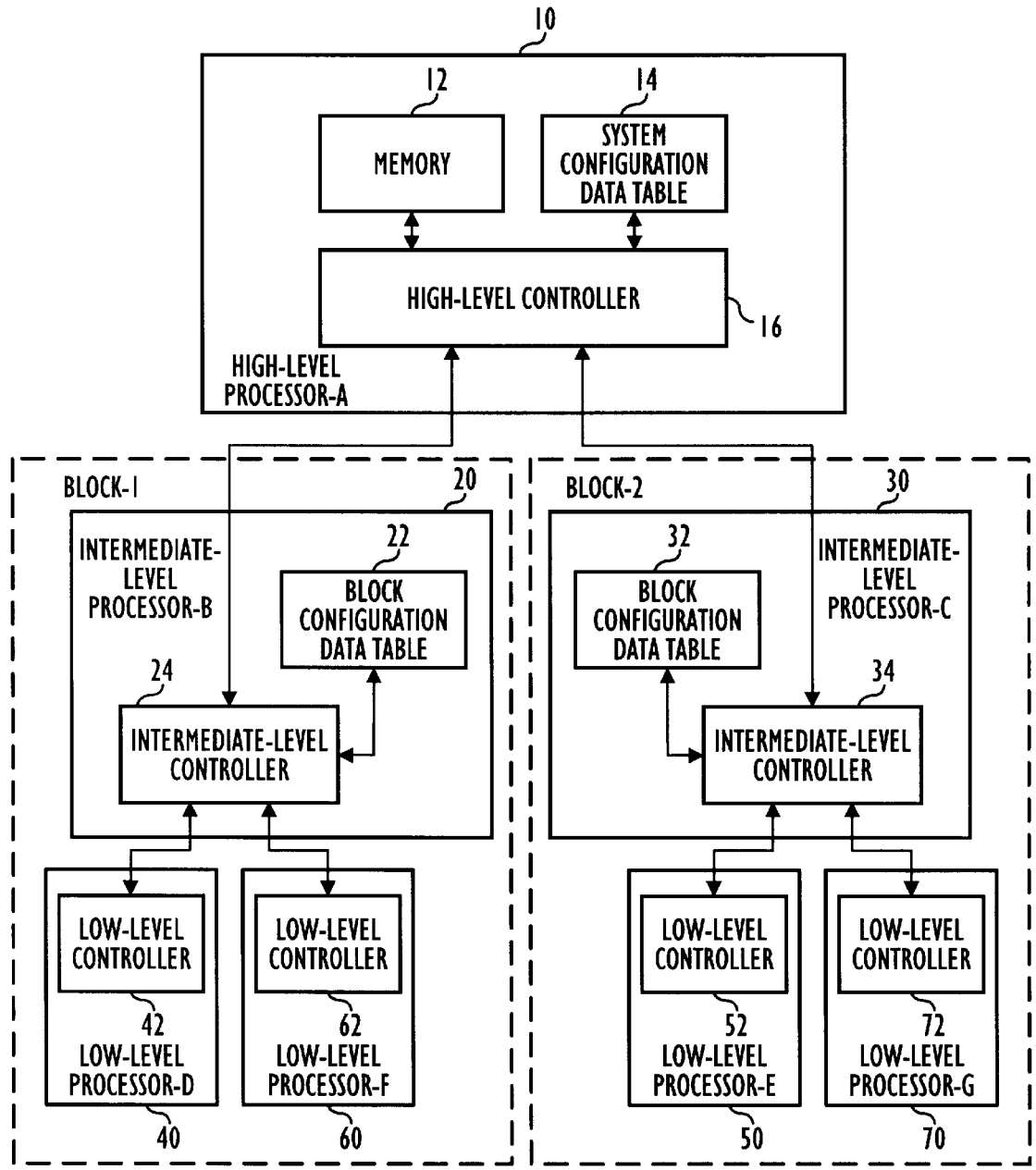
FIG. 2 is a block diagram showing a first embodiment of a distributed hierarchical processing system according to the present invention.

A description will be given, with reference to FIG. 2, of a distributed hierarchical processing system for down loading information, such as programs, to processors in the system according to a first embodiment of the present invention. The distributed hierarchical processing system comprises a high-level processor 10, intermediate-level processors 20 and 30, low-level processors 40, 50, 60 and 70. As is shown in FIG. 2, the processors in the system are distributed in three hierarchical levels, such as a high-level processor level, an intermediate-level processor level and a low-level processor level. The high-level processor 10 is connected to both of the intermediate-level processors 20 and 30. The intermediate-level processor 20 is connected to the low-level processors 40 and 60. Also, the intermediate-level processor 30 is connected to the low-level processors 50 and 70.

The high-level processor 10 stores information to be down loaded to the intermediate-level and the low-level processors and sends the information to the intermediate-level processors 20 and 30 on the basis of system configuration data, wherein the system configuration data represents a type and an address for all paths connecting pairs of the processors installed in the system.

The intermediate-level processor 20, connected to the high-level processor 10, receives the information from the high-level processor 10. The intermediate-level processor 20 sends the configuration data about not only the intermediate-level processor 20 but also the low-level processors 40 and 60 to the high-level processor 10.

The intermediate-level processor 80, connected to the high-level processor 10, receives the information from the high-level processor 10. The intermediate-level processor 30 also sends the configuration data about not only the intermediate-level processor 30 but also the low-level processors 50 and 70 to the high-level processor 10.

The low-level processors 40 and 60 are connected to the Intermediate-level processor 20. The low-level processors 40 and 60 send the configuration data about the low-level processors 40 and 60, respectively, to the intermediate-level processor 20 and receives the information to be down loaded thereto from the intermediate-level processor 20.

In the same way as described above, the low-level processors 50 and 70 are connected to the intermediate-level processor 30. The low-level processors 50 and 70 send the configuration data about the low-level processors 50 and 70, respectively, to the intermediate-level processor 30 and receives the information from the intermediate-level processor 30.

In the first embodiment of the distributed hierarchical processing system of the present invention, the system has three hierarchical levels, wherein each of three hierarchical levels includes one stage. The one stage means that more than two processors are not connected in series within one hierarchical level. But it should be noted that the number of the processor's stages within the intermediate hierarchical level is not restricted to one, because a series connection of the intermediate-level processors can operate similarly to one intermediate-level processor as a whole. Therefore, the intermediate hierarchical level may include more than two stages.

Two groups of the processors, block-1 and block-2, are shown in FIG. 2 as dashed boxes. The block-1 includes the intermediate-level processor 20 and the low-level processors 40 and 60. The block-2 includes the intermediate-level processor 30 and the low-level processor 50 and 70. Then, the intermediate-level processors 20 and 30 can collect the configuration data corresponding to the block-1 and block-2, respectively. The term block represents a part of the distributed hierarchical system.

According to the first embodiment of the distributed hierarchical processing system of the present invention, the high-level processor 10 is separately connected to the intermediate-level processors 20 and 30. And also the intermediate-level processor 20 is separately connected to the low-level processors 40 and 60. In this case, the intermediate-level processors 20 and 30 do not directly communicate with each other, nor do the low-level processors 40 and 60 directly communicate with each other.

However, it is also noted that network architecture would not be restricted to the above-mentioned architecture as an exemplary case. Various network architectures are available such that all of the processors are directly connected with each other, or some of processors are connected to a common link and some are connected directly with each other. According to the present invention any type of the network architectures may be employed if only the pair of processors connected with each other can communicate with each other, or bi-directionally.

In FIG. 2, the high-level processor 10 comprises a memory for storing the programs to be down loaded to the processors and a system configuration data table 14 for storing the system configuration data. The high-level processor 10 also comprises a high-level controller 16 for managing the system configuration data table 14 and for down loading the programs to other processors.

As shown in FIG. 2, the intermediate-level processor 20 comprises a block configuration data table 22 for storing the configuration data from the low-level processors 40 and 60. The intermediate-level processor 20 also comprises an intermediate-level controller 24 for receiving the configuration data from the low-level processors 40 and 60 and creating the block configuration data table 22. The intermediate-level controller 24 also receives the program to be down loaded from the high-level processor 10, loads the program, if necessary, into a memory, not shown in FIG. 2, and sends the program to be down loaded to the low-level processor 40 and 60.

The low-level processors 40 and 60 comprise low-level controllers 42 and 62, respectively, for sending the configuration data to the intermediate-level processor 20 and receiving the program to be down loaded from the intermediate-level processor 20. The low-level controllers 40 and 60 also load the received program to be down loaded, if necessary, into memories, not shown, respectively.

Similarly, as shown in FIG. 2, the intermediate-level processor 30 comprises a block configuration data table 32 for storing the configuration data from the low-level processors 50 and 70. The intermediate-level processor 30 also comprises an intermediate-level controller 34 for receiving the configuration data from the low-level processors 50 and 70 and for creating the block configuration data table 32. The intermediate-level controller 34 also receives the program to be down loaded from the high-level processor 10, loads the program, if necessary, in a memory, not shown in FIG. 2, and sends the program to be down loaded to the low-level processor 50 and 70.

The low-level processors 50 and 70 comprise a low-level controllers 52 and 72, respectively, for sending the configuration data to the intermediate-level processor 30 and for receiving the program to be down loaded from the intermediate-level processor 30. The low-level controllers also load the received program to be down loaded, if necessary, into memories, not shown, respectively.

Figure 3:
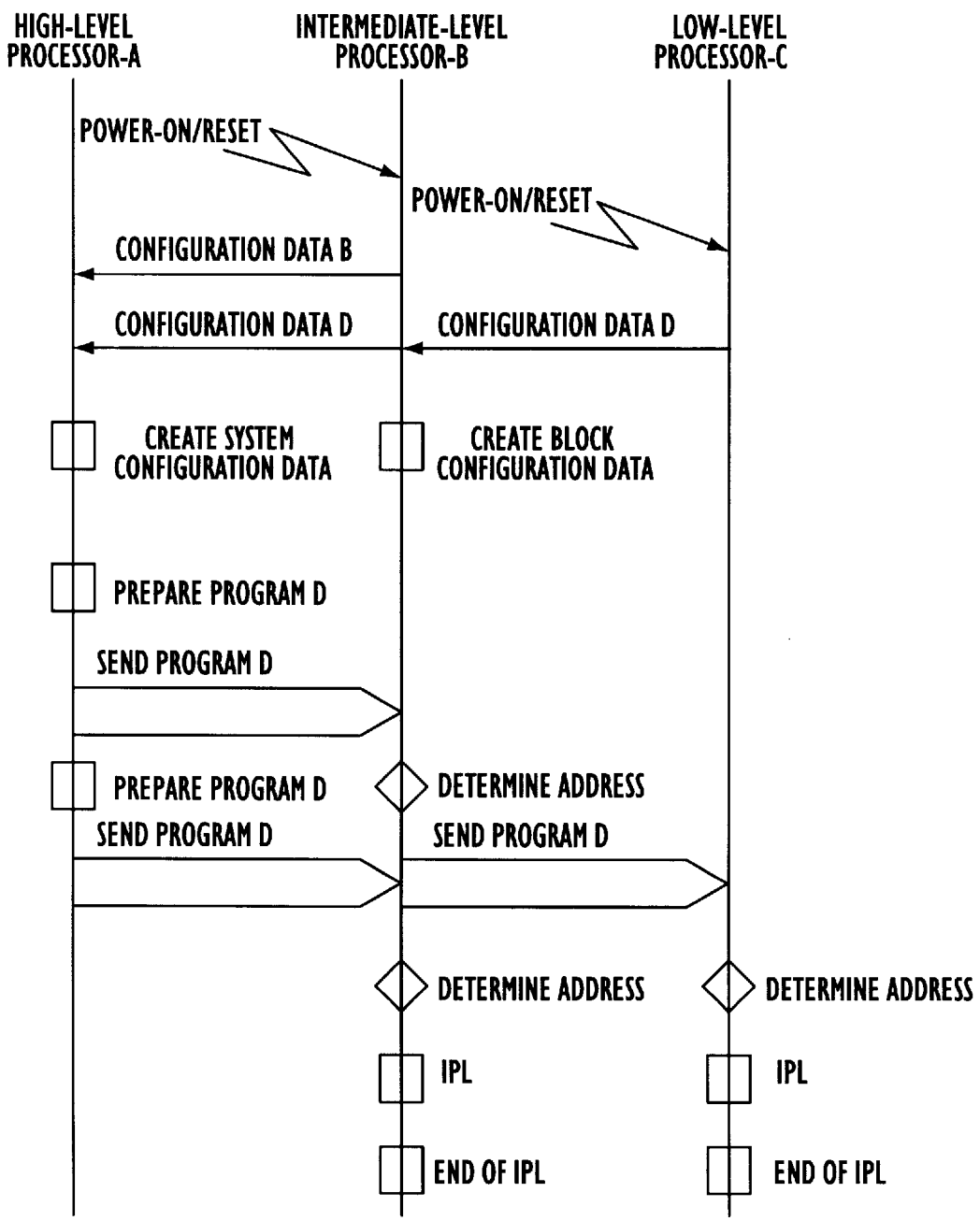
FIG. 3 is a diagram for explaining a sequence of an initial program load process according to the first embodiment of the present invention.

A description will be given, with reference to FIG. 3, of a sequence of the initial program load according to the first embodiment of the present invention. FIG. 3 shows a sequence chart for down loading the program via paths between the high-level processor 10 and the intermediate-level processor 20 and between intermediate-level processor 20 and the low-level processor 40.

First, the intermediate-level processor 20 is started by being powered on or being reset and sends the configuration data about the intermediate-level processor 20 to the high-level processor 10.

The high-level controller 16 of the high-level processor 10 begins to create the system configuration data table 14 after receiving the configuration data from the intermediate-level processor 20.

When the low-level processor 40 is powered on or reset, the low-level processor 40 sends the configuration data about the low-level processor 40 to the intermediate-level processor 20 with which the lower processor is connected.

The intermediate-level controller 24 of the intermediate-level processor 20 begins creating the block configuration data table 22 after receiving the configuration data from the low-level processor 40. The intermediate-level controller 24 also sends the configuration data from the low-level processor 40 to the high-level processor 10.

Then, the high-level controller 16 of the high-level processor 10 adds the received configuration data about the low-level processor 40 onto the system configuration data table 14. Now, the high-level controller 16 has created the system configuration data table for storing the configuration information about the intermediate-level processor 20 and the low-level processor 40. Thus, the high-level controller 16 searches the system configuration data table 14 for the lowest hierarchical level processor so that the high-level controller 16 can start down loading the programs with the lowest hierarchical level processor. The lowest hierarchical level processor to be down loaded is referred to as a target processor hereinafter. In this case, the high-level controller 16 selects the low-level processor 40 as the target processor.

The high-level controller 16, then, searches the memory 12 for the program to be down loaded in accordance with the selected target processor, i.e., for example, the low-level processor 40. The high-level controller 16 sends the program related to the low-level processor 40 to the intermediate-level processor 20, wherein a destination label representing an address for the target processor to be down loaded, the low-level processor 40, is added to the program.

Then, the intermediate-level controller 24 of the processor 20 receives the programs to be down loaded from the high-level processor 10. The intermediate-level controller 24 then determines whether the received program has been addressed to the intermediate-level processor 20 or not on the basis of the destination label added to the program. In this case, since the program has been addressed to the low-level processor 40, the intermediate-level controller 24 searches the block configuration data table 22 for the low-level processor 40. The intermediate-level controller 24 can find the low-level processor 40 in the block configuration data table 22 because the intermediate-level processor 20 is connected to the low-level processor 40. Therefore, the intermediate-level controller 24 sends the program received from the high-level processor 10 to the low-level processor 40.

During the above-mentioned process of the intermediate-level controller's determination and transfer, the high-level controller 16 can operate at the same time. Therefore, after sending the program, addressed to the low-level processor 40, to the intermediate-level processor 20, the high-level controller 16 searches again the system configuration data table 14 for the processor to be down loaded, and finds the intermediate-level processor 20. Then, the high-level controller 16 searches the memory 12 for the program corresponding to the intermediate-level processor 20. The high-level controller 16 sends the found program to be down loaded to the intermediate-level processor 20.

Accordingly, one transfer of the program from the intermediate-level processor 20 to the low-level processor 40 and the other transfer of another program from the high-level processor 10 to the intermediate-level processor 20 can be executed in parallel. It is an advantage of the first embodiment of the present invention that a plurality of programs are transferred in parallel. This advantage is achieved by transferring the programs in a special sequence so that the programs for the lower hierarchical level processors are transferred from the high-level processor 10 earlier than the programs for the higher hierarchical level processors.

The low-level controller 42 of the low-level controller 40 receives the program from the intermediate-level processor 20. And then the low-level controller 42 determines whether the program has been addressed to the low-level processor 40 on the basis of the destination label added onto the received program. If it is found that the program has been addressed to the low-level processor 40, then the low-level controller 42 loads the program into the memory, not shown. Consequently, the IPL process for the low-level processor 40 ends.

The intermediate-level controller 24 of the intermediate-level controller 20 also receives the program to from the high-level processor 10. And then the intermediate-level controller 24 determines whether the program has been addressed to the intermediate-level processor 20 on the basis of the destination label added onto the received program. If it is found that the program has been addressed to the intermediate-level processor 20, then the intermediate-level controller 24 loads the program into the memory, not shown. If not, then the program has been addressed to other processors, and thus the intermediate-level controller 24 continues to search for the processors specified by the destination label and send the program to the processors until the intermediate-level controller 24 finds the program addressed to the intermediate-level processor 20. Consequently, the IPL process for the intermediate-level processor 20 ends.

At this point, the whole IPL process has been completed.

A detail description will be given, with reference to FIGS. 4 to 13, of the distributed hierarchical system for down loading the programs according to the first embodiment of the present invention.

FIG. 4A shows a format of a record for representing a configuration data in the first embodiment of the present invention. The configuration data record is sent from a lower processor to a higher processor and indicates a path connecting the lower processor with the higher processor. The record contains data such as header for transmission, lower processor type, lower processor address, higher processor type, higher processor address and number of levels.

The header for transmission indicates a type of transmitted information such as configuration data or a program. In this case, a type corresponding to the configuration data is specified to the header for transmission.

The lower processor type and the lower processor address represent the type and the address, respectively, of the lower processor for sending the configuration data to the higher processor. The processor type, for example, represents functions of the processor such as maths, communications or graphics. The processor address is an identifier to specify an identifiable logical location of the processor in the system.

The higher processor type and the higher processor address also represent the type and the address, respectively, of the higher processor for receiving the configuration data from the lower processor. And the higher processor is located at the hierarchical level higher than that of the lower processor by one level.

The number of levels in the configuration data record represents a difference of the hierarchical levels between the higher processor and the lower processor.

The following descriptions will be given with reference to the configuration data, shown in FIG. 4, but the format of the record for representing the configuration data is not limited to the above exemplary embodiment. Any configuration data consisting of enough data to create a system configuration data table may be used.

The following table 1 shows a list of the processor's information such as processor name, processor type and processor address concerning the distributed hierarchical system in the first embodiment of the present invention.

TABLE 1

| processor name | type | address |
|---|---|---|
| high-level processor-A | 1 | 10 |
| intermediate-level processor-B | 2 | 21 |
| intermediate-level processor-C | 3 | 31 |
| low-level processor-D | 4 | 41 |
| low-level processor-E | 5 | 51 |
| low-level processor-F | 6 | 61 |
| low-level processor-G | 7 | 71 |

Modifications of the record for representing the configuration data according to the first embodiment of the present invention are shown in FIGS. 5A to 5C.

First, the low-level controller 42 of the low-level processor-D 40 creates the configuration data, for example, as shown in FIG. 5A. The header field of the configuration data contains an appropriate data for representing that the information to be transmitted is the configuration data. The lower processor type and the lower processor address indicate the type and the address of the low-level processor-D 40, i.e. 4 and 41, respectively. Because the processor to which the configuration data should be sent from the low-level processor-D 40 has not been decided, both of the higher processor type and the higher processor address are blank (for example, the type and address are represented as '–' in FIG. 5A). And '0' is initially set to the number of levels so that the low-level processor-D 40 set to the lower processor fields of the record can be appreciated by a receiver as an original transmitter of the data.

Then, the low-level controller 42 sends the configuration data to the higher processor connected to the low-level processor-D 40. And the intermediate-level controller 24 of the intermediate-level processor-B 20 can receive the configuration data from the low-level processor-D 40.

The intermediate-level controller 24 adds further information onto the received configuration data from the low-level processor-D 40 as shown in FIG. 5B. The intermediate-level controller 24 can recognize that the intermediate-level processor-B 20 is located at the higher hierarchical level than that of the low-level processor-D 40 by 1 level since '0' has been set to the number of levels of the received configuration data. Then the intermediate-level controller 24 sets both the type of 2 and the address of 21 corresponding to the intermediate-level processor-B 20 to the higher processor type and the higher processor address, respectively, in the received configuration data. In addition, the intermediate-level controller 24 increases by 1 the number of levels in the received configuration data. This means that the current processor, i.e. the intermediate-level processor-B 20, has received the configuration data originally created by the processor at the lower hierarchical level than that of the current processor by 1 level.

After the contents of the configuration data are modified, the intermediate-level controller 24 of the intermediate-level processor-B 20 sends the modified configuration data to the higher processor.

In this case, the higher processor for the intermediate-level processor-B 20 is the high-level processor-A 10. Therefore, the high-level controller 16 of the high-level processor-A 10 receives the modified configuration data, shown in FIG. 5B, from the intermediate-level processor-B 20. The high-level controller 16 can recognize that the high-level processor-A 10 does not correspond to the higher processor for the processor which has originally created the configuration data. Thus, the higher processor type and the higher processor address are not required to be modified. However, the high-level controller 16 increases by 1 the number of the levels in the received configuration data, as shown in FIG. 5C. The increased value for the number of the levels indicates that the high-level processor-A 10 has received the configuration data corresponding to the processor located at the lower hierarchical level than that of the high-level processor-A 10 by two levels.

The configuration data, shown in FIG. 5C, represents that there is one processor (type=4 and address=41) located at the hierarchical level lower by two levels than that of a target processor which will receive the configuration data finally. Also the configuration data represents that the processor (type=4 and address=41) is connected to the target processor through another processor (type=2 and address=21) located at the hierarchical level higher than that of the one processor (type=4 and address=41).

Figure 6:
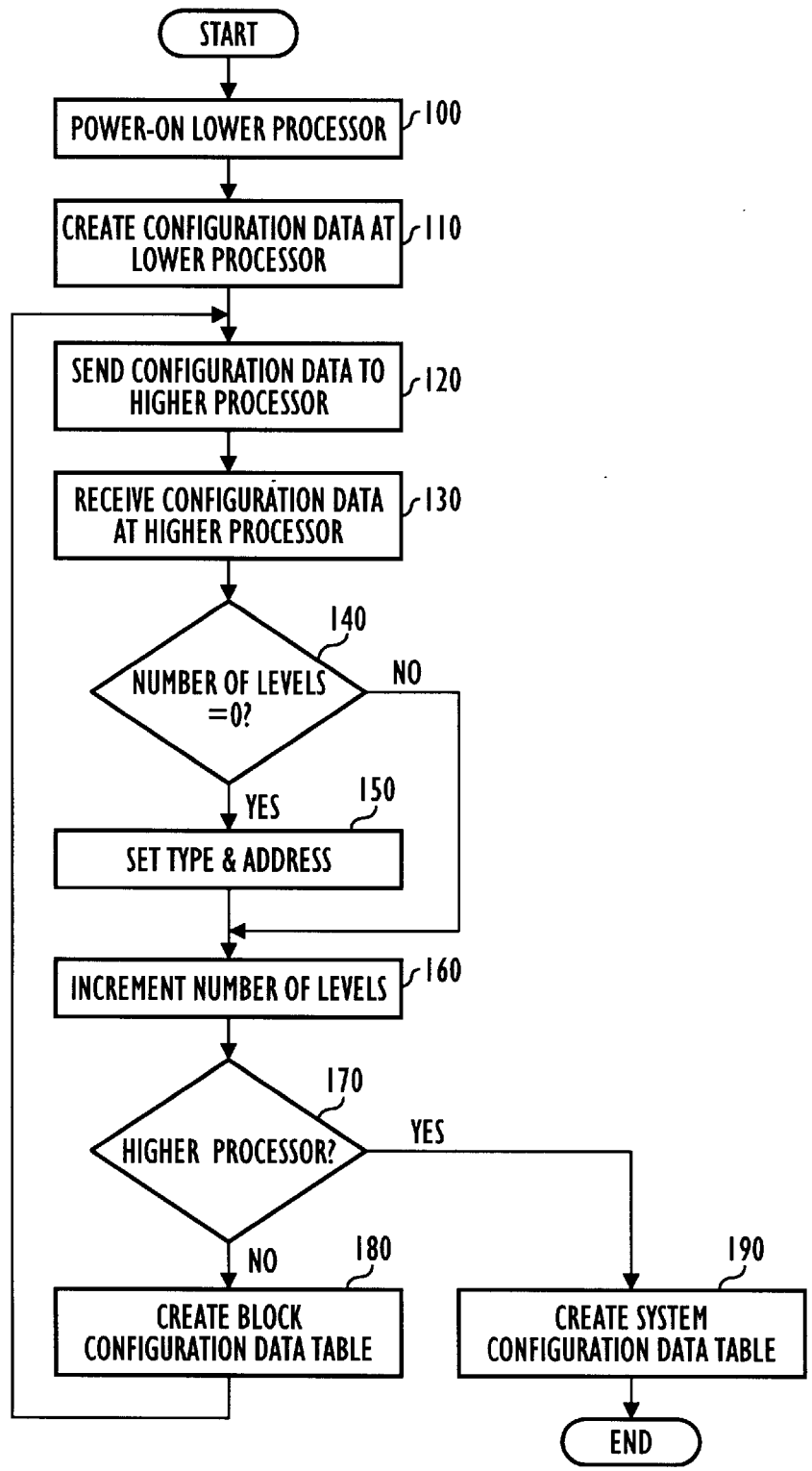
FIG. 6 is a flow chart for explaining an operation for reporting a configuration data according to the first embodiment of the present invention.

FIG. 6 shows a flow chart for explaining an operation for reporting a configuration data from a lower processor to the high-level processor according to the first embodiment of the present invention.

First, the lower processor is powered on or reset so that the lower processor is started in S100. In S110, the started lower processor creates a configuration data corresponding to the lower processor as described above. An exemplary configuration data is shown in FIG. 5A. Then the lower processor sends the configuration data to a higher processor connected to the lower processor in S120.

The higher processor receives the configuration data sent from the lower processor in S130. The higher processor determines whether the number of levels contained in the configuration data equals 0, i.e. whether the higher processor corresponds to a processor located at a hierarchical level higher than that of the lower processor by 1 level in S140. If an answer is no, the higher processor increases by 1 the number of levels contained in the configuration data in S160. If the answer is yes, the higher processor sets the type and address of the higher processor to fields of the higher processor type and the higher processor address in the configuration data, respectively, in S150. Then the higher processor proceeds to S160.

The higher processor determines whether the higher processor is the high-level processor of the distributed hierarchical system in S170. If an answer is no, then the higher processor, i.e. the intermediate-level processor in the system, generates a block configuration data table in S180 and proceeds again to S120. A loop from S120 to S180 is repeatedly executed until the high-level processor of the system is found in S170. If the answer is yes, then the higher processor, i.e. the high-level processor generates a system configuration data table in S190. Consequently, the process for reporting the configuration data from the lower processor to the high-level processor is terminated.

A description will be given, with reference to FIG. 7, of a system configuration data table according to the first embodiment of the present invention. FIG. 7 shows the system configuration data table 14 created in the high-level processor-A 10. The system configuration data table 14 consists of data such as number of levels, lower processor type, lower processor address, higher processor type and higher processor address for each of processors installed in the distributed hierarchical processing system except for the high-level processor-A 10. One row in the system configuration data table is assumed to represent that a path for transmitting information is present between the lower processor and the higher processor connected to the former.

The lower processor type and the lower processor address in the system configuration data table 14 represent the type and the address, respectively, of the lower processor as described above with reference to FIG. 4.

The higher processor type and the higher processor address also represent the type and the address, respectively, of the higher processor connected to the lower processor. And the higher processor is located at the hierarchical level higher than that of the lower processor by 1 level.

The number of levels in the system configuration data table 14 is a difference of the hierarchical levels between the lower processor and the high-level processor-A 10.

For example, the first row of the system configuration data table 14, shown in FIG. 7, represents a path between the higher processor (type=1 and address=11) and the lower processor (type=2 and address=21). Then we can determine that the higher processor corresponds to the high-level processor-A 10 and the lower processor corresponds to the intermediate-level processor-B 20 by searching the Table 1 for the higher and lower processors listed on the first row of the system configuration data table 14. Also the number of levels, i.e. 1, is equal to the difference of the hierarchical levels between the high-level processor-A 10 and the intermediate-level processor-B 20. We can know that the first row of the system configuration data table 14 has been originated from the configuration data created by the intermediate-level processor-B 20.

The second row of the system configuration data table 14, shown in FIG. 7, also is found to represent the path between the intermediate-level processor-B 20 and the low-level processor-D 40. In this case, since the low-level processor-D 40 is located at the hierarchical level lower than that of the high-level processor-A 10 by 2 levels, the number of levels has a value of 2. As for the second row of the system configuration data table 14, we can understand that it has been originated from the configuration data created by the low-level processor-D 40 and modified by the intermediate-level processor-B 20.

Thus, the system configuration data table 14 is formed on the basis of a collection of the configuration data from all of the processors installed in the system excepting for the high-level processor-A 10.

A description will be given, with reference to FIG. 8, of block configuration data tables according to the first embodiment of the present invention. FIG. 8A shows the block configuration data table 22 created in the intermediate-level processor-B 20 and FIG. 8B shows the block configuration data table 32 created in the intermediate-level processor-C 30. The block configuration data tables 22 and 32 also contain data such as number of levels, lower processor type, lower processor address, higher processor type and higher processor address.

The block configuration data table 22 of the intermediate-level processor-B 20 is formed of a collection of the configuration data corresponding to the processors located at the lower hierarchical level than that of the intermediate-level processor-B 20. Also, the block configuration data table 32 of the intermediate-level processor-C 30 is formed of a collection of the configuration data corresponding to the processors located at the lower hierarchical level than that of the intermediate-level processor-C 30.

In this case, because there is only one hierarchical level lower than the intermediate-level processors 20 and 30, respectively, the number of levels in the block configuration data table 22 and 32 is always equal to 1.

As shown in FIGS. 7 and 8, the system configuration data table and the block configuration data table are formed in the same way. This similarity allows the intermediate-level processor to acquire all of the configuration data about processors connected lower than the intermediate-level processor. And it is an advantage according to the first embodiment of the present invention that a simple and common management is used for both of the system and block configuration data tables.

Figure 9:
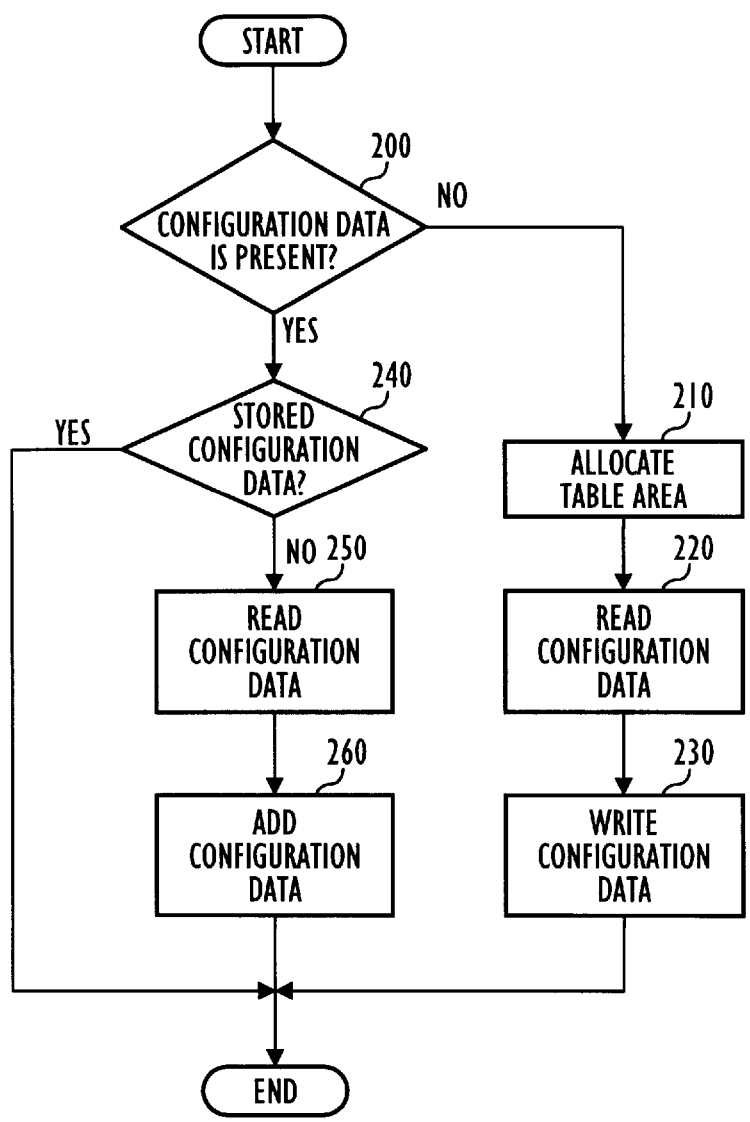
FIG. 9 is a flow chart for explaining an operation for creating a configuration data table according to the first embodiment of the present invention.

A description will be given, with reference to FIG. 9, of a flow chart for explaining a method for creating a configuration data table according to the first embodiment of the present invention. Since the system configuration data table and the block configuration data table have the same data structure, both tables can be created in the same way described below. The following description will be given on the basis of the method for creating the system configuration data table 14 by the high-level controller 16 of the high-level processor-A 10. But the explanation holds if the system configuration data table 14 and the high-level controller 16 of the high-level processor 10 would be replaced with the block configuration data table 22 or 32 and the intermediate-level controller 24 or 34 of the intermediate-level processor 20 or 30, respectively.

When the high-level controller 16 has received configuration data from a level processor, the controller 16 determines whether any data has already been present at the system configuration data table 14 in S200.

If no data is present at the system configuration data table 14, i.e. the system configuration data table 14 has not been created, then the high-level controller 16 proceeds to S210 and allocates an appropriate size of areas for creating and storing new configuration data in the form of the system configuration data table 14. Then, the controller 16 reads the received configuration data in S220. And the high-level controller 16 writes the configuration data at the top of the allocated areas in S230. Consequently, this creation of the new configuration data in the system configuration data table 14 has been completed.

If the data is present at the system configuration data table 14, then the high-level controller 16 proceeds to S240. The high-level controller 16 determines whether the data corresponding to the received configuration data has already been stored in the system configuration data table 14 in S240. If the data corresponding to the received configuration data is present, then the high-level controller 16 terminates the creation of the new configuration data without modifying the system configuration data table 14. If the data is not present, the high-level controller 16 proceeds to S250 and reads the received configuration data. Then, the high-level controller 16 adds the read configuration data to the system configuration data table 14 in S260 and terminates the creation of the new configuration data.

According to the method described above, the system configuration data table 14 in the high-level processor-A 10, the block configuration data table 22 in the intermediate-level processor-B 20 and the block configuration data table 32 in the intermediate-level processor-C 30 are created.

Then, the high-level controller 16 of the high-level processor-A 10 can start to down load programs stored in the memory 12 to the lower processors installed in the system.

Figure 10:
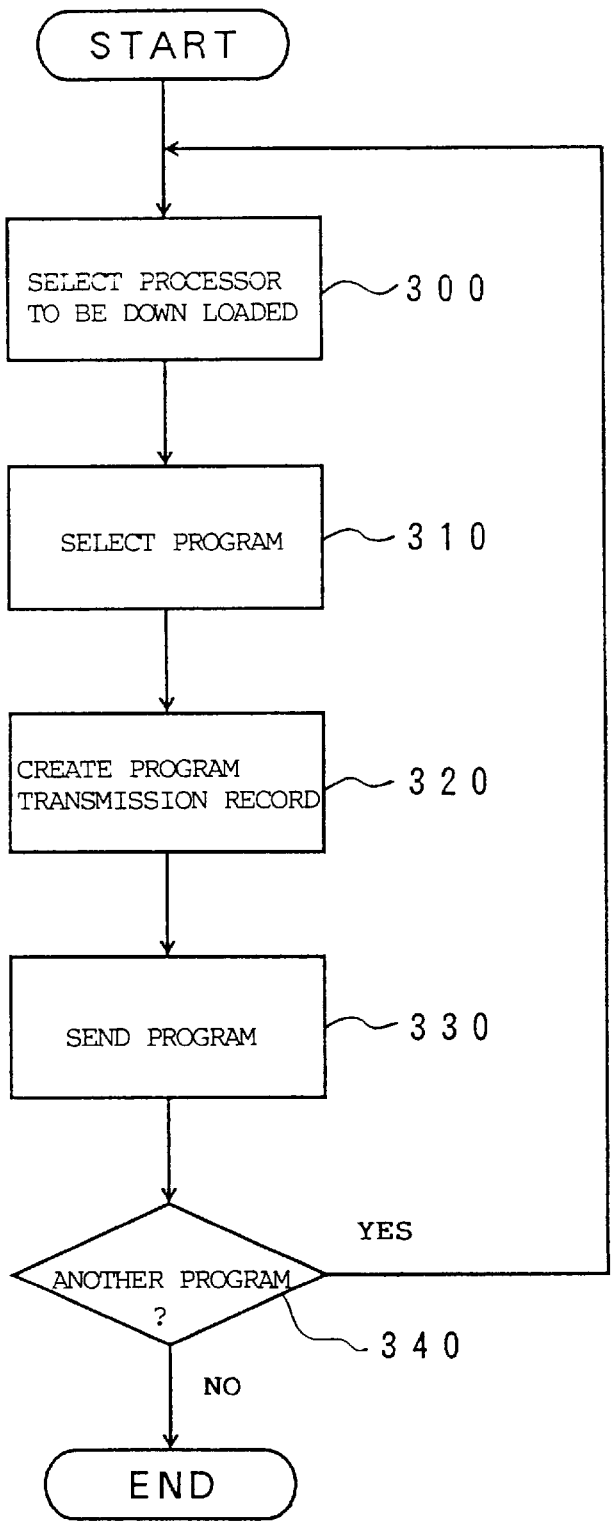
FIG. 10 is a flow chart for explaining an operation of a high-level processor for down loading information according to the first embodiment of the present invention.

A description will be given, with reference to FIG. 10, of a flow chart for explaining a method for down loading programs from the high-level processor according to the first embodiment of the present invention.

First, the high-level controller 16 of the high-level processor-A 10 searches successively the system configuration data table 14 for a processor having a maximum value of the number of levels, and selects repeatedly the processors so that the programs are down loaded to the selected processors in S300. Then, the high-level controller 16 retrieves the program corresponding to the type and the address of the selected processor from the memory 12 for storing the programs in S310. In this case, for example, the low-level processor-D 40 is selected as the first processor to be down loaded thereto on the basis of the system configuration data table 14, shown in FIG. 7.

Next, the high-level controller 16 operates as follows in S320. The high-level controller 16 searches the system configuration data table 14 for the higher processor connected to the low-level processor-D 40 to be down loaded. In this case, the intermediate-level processor-B 20 is determined as the higher processor for the low-level processor-D 40. If the determined processor is not directly connected to the high-level processor-A 10, the high-level controller 16 again searches the system configuration data table 14 for the further higher processor until the higher processor is found to be connected to the high-level processor-A 10. And the higher processor connected to the high-level processor-A 10 is determined to be the destination processor to which the high-level controller 16 should first send the program. The high-level controller 16 adds a record for transmitting the program onto the program selected in S310. The record for transmitting the program, for example, contains data such as header for transmission, IPL processor type, source processor address and destination processor address. The transmitted data, referred to as a program transmission record hereinafter, contains the record and the program to be down loaded. Thus, the high-level controller 16 can prepare the program transmission record. In this case, the IPL processor type is 41 for the low-level processor-D 40, the source processor address, or the address of the processor from which the program is sent, is 11 for the high-level processor-A 10 and the destination processor address is 21 for the intermediate-level processor-B 20.

It should be noted that the program transmission record contains not the IPL processor address but the IPL processor type. A very efficient down loading process is achieved by employing the IPL processor type, because the high-level controller 16 can down load programs to several processors having the same processor type at once. On the contrary, if the high-level controller 16 sends the program on the basis of the IPL processor address, the same program could be down loaded from the high-level controller 16 more than twice.

Then, the high-level controller 16 of the high-level processor 10 sends the program transmission record to the destination processor, for example, the intermediate-level processor-B 20 in S330.

The high-level controller 16 determines whether there still remain the programs, to be sent, in the memory 12 for storing the programs in S340. If there remains at least one program to be down loaded, then the high-level controller 16 proceeds back to S300 for further processing. If there remains no programs to be down loaded, then the high-level controller 16 terminates processing to send the programs to the lower processors.

Figure 11:
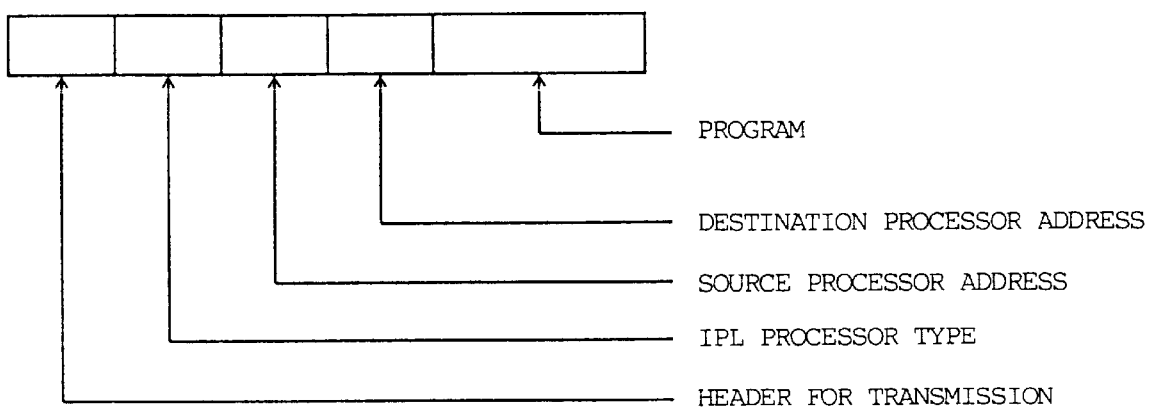
FIG. 11 shows a record format for sending a program according to the first embodiment of the present invention.

A description will be given, with reference to FIG. 11, of a program transmission record according to the first embodiment of the present invention. The program transmission record contains data such as header for transmission, IPL processor type, source processor address, destination processor address and program as described above.

The header for transmission represents that the transmitted data are the program to be down loaded. The IPL processor type represents the type of the processors which should receive and load the down loaded program.

The source processor address is the address of the processor which sends the program to the lower processor therefrom. The destination processor address is the address of the processor which receives the program sent from the processor corresponding to the source processor address. The source processor address and the destination processor address correspond to the higher processor address and the lower processor address, respectively, in the system and/or block configuration data table. Therefore, the source and destination processor addresses are modified successively as the program transmission record is transferred from the higher processor to the lower processor.

For example, when the program transmission record is first sent from the high-level processor-A 10 to the intermediate-level processor-B 20 and then sent from the intermediate-level processor-B 20 to the low-level processor-D 40, the program transmission record is modified as follows.

| Header | IPL type | Source | Destination |
|--------|----------|--------|-------------|
| 2 | 4 | 11 | 21 |
| 2 | 4 | 21 | 41 |

The header for transmission and the IPL processor type must not be changed while the program with the program transmission record is sent successively from the higher processor to the lower processor. Also, the program to be down loaded is unchanged.

Figure 12:
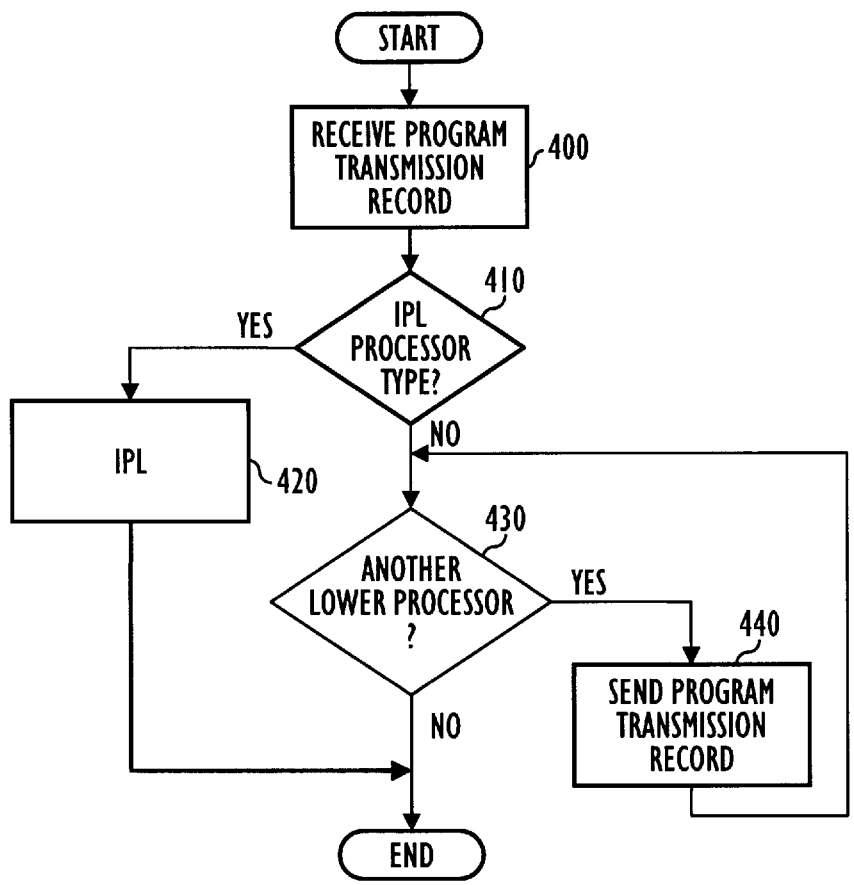
FIG. 12 shows a flow chart for explaining an operation of a lower processor for loading information according to the first embodiment of the present invention.

A description will be given, with reference to FIG. 12, of a flow chart for explaining a down loading operation of a lower processor according to the first embodiment of the present invention. In the following description, the lower processor is assumed to be the intermediate-level processor-B 20, but the lower processor may either an intermediate-level processor or a low-level processor.

The intermediate-level controller 24 of the intermediate-level processor-B 20 receives a program transmission record from the high-level processor-A 10 in S400. Then, the intermediate-level controller 24 determines whether an IPL processor type in the received program transmission record is equal to the intermediate-level processor-B's type in S410.

If the IPL processor type is equal to the intermediate-level processor-B's type, then the intermediate-level controller 24 extracts the program from the program transmission record and loads the extracted program into a memory in the intermediate-level processor-B 20 in S420. Then, the down loading operation of the intermediate-level processor-B 20 terminates.

If the IPL processor type is not equal to the intermediate-level processor-B's type, then the intermediate-level controller 24 searches the block configuration data table 24 for the processor having the type corresponding to the IPL processor type in S430. If the corresponding processor, for example, the low-level processor-D 40, is found, then the intermediate-level controller 24 modifies the received program transmission record as described above and sends the program transmission record to the low-level processor-D 40 in S440. Then, the intermediate-level controller 24 returns to S430 for finding further processors to be down loaded.

In this case, the intermediate-level controller and the low-level controller are assumed to operate in the same way. However, the intermediate-level controller and the low-level controller may operate differently. For example, the low-level processor may skip steps S430 and S440.

According to the first embodiment of the present invention, it is an advantage that one processor can determine whether the received program should be loaded into the one processor by simply comparing the IPL processor type with the one processor's type.

Furthermore, according to the first embodiment of the present invention, the intermediate-level processor can advantageously select appropriate processors, to which the intermediate-level processor should send the program transmission record, on the basis of the IPL processor type, so that efficiency of the down loading process can be improved.

Figure 13:
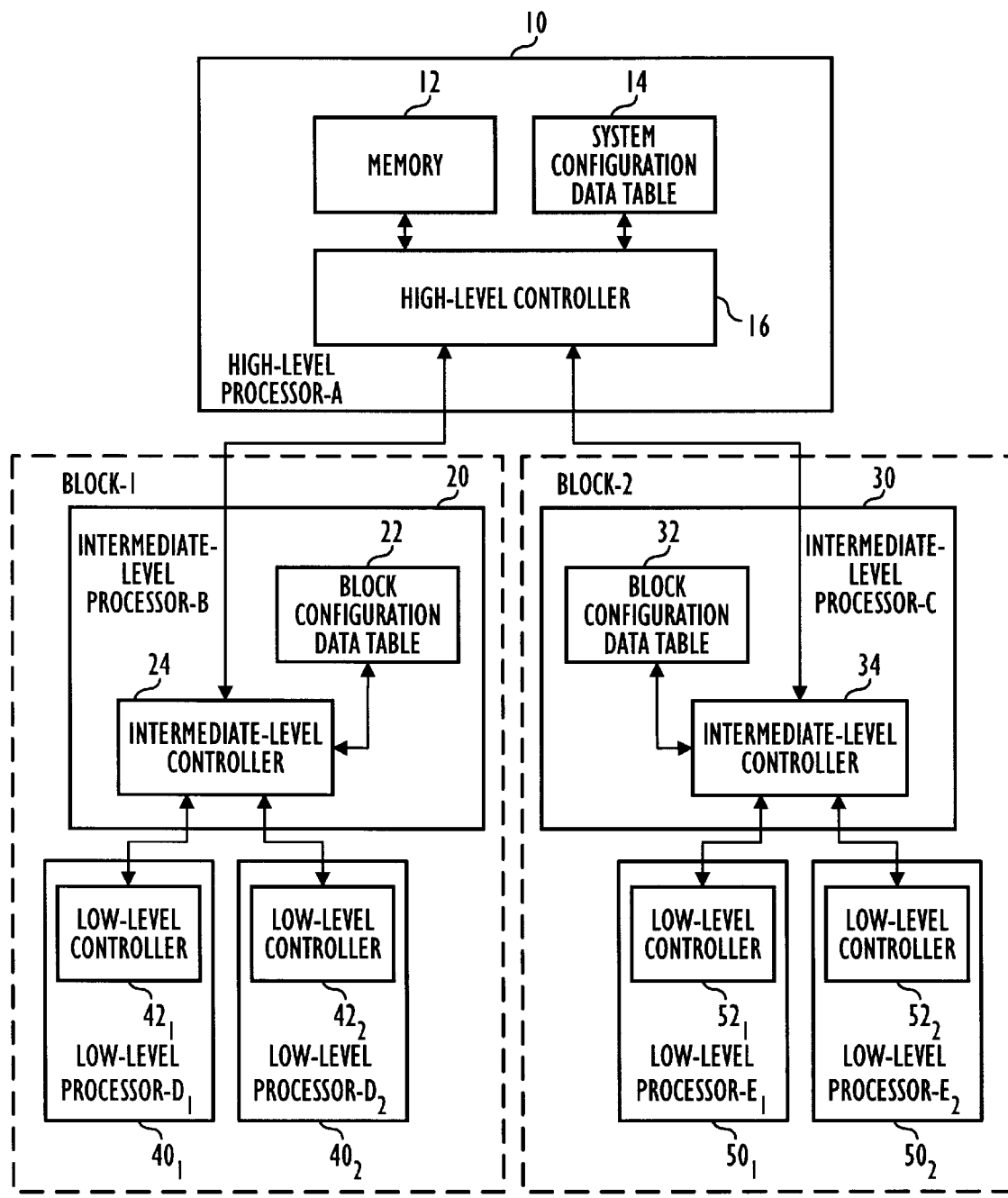
FIG. 13 is a block diagram showing a second embodiment of a distributed hierarchical processing system according to the present invention.

A description will be given, with reference to FIG. 13, of a distributed hierarchical processing system for down loading programs according to a second embodiment of the present invention. The system comprises a high-level processor 10, intermediate-level processors 20 and 30, low-level processors 40$_1$, 40$_2$, 50$_1$ and 50$_2$. As is shown in FIG. 13, the processors in the system are distributed in three hierarchical levels, such as a high-level processor level, an intermediate-level processor level and a low-level processor level in the same way as the first embodiment of the present invention. The high-level processor 10 is connected to both of the intermediate-level processors 20 and 30. The intermediate-level processor 20 is connected to the low-level processors 40$_1$ and 40$_2$. Also, the intermediate-level processor 30 is connected to the low-level processors 50$_1$ and 50$_2$. In this case, the low-level processors 40$_1$ and 40$_2$ have the same processor type, and the low-level processors 50$_1$ and 50$_2$ have the same processor type.

The following table 2 shows a list of the processor's information such as processor name, processor type and processor address concerning the distributed hierarchical system in the second embodiment of the present invention.

TABLE 2

| processor name | type | address |
|----------------|------|---------|
| high-level processor-A | 1 | 10 |
| intermediate-level processor-B | 2 | 21 |
| intermediate-level processor-C | 3 | 31 |
| low-level processor-D$_1$ | 4 | 41 |
| low-level processor-D$_2$ | 4 | 42 |
| low-level processor-E$_1$ | 5 | 51 |
| low-level processor-E$_2$ | 5 | 52 |

A description will be given, with reference to FIG. 14, of a system configuration data table according to the second embodiment of the present invention. FIG. 14 shows the system configuration data table 14 created in the high-level processor-A 10. The system configuration data table 14 contains data such as number of levels, path number, lower processor type, lower processor address, higher processor type and higher processor address for each of processors installed in the distributed hierarchical processing system except for the high-level processor 10.

It should be noted that the system configuration data table according to the second embodiment of the present invention differs from that of the first embodiment of the present invention in that the former additionally has the path number. The path number is used to identify each of the lower processors connected to the higher processor if the lower processors have the same processor type. As described above in the first embodiment of the present invention, when the processors have the same processor type, the higher processor sends the program transmission record to all of the lower processors having the same processor type. Therefore, if there are several lower processors having the same processor type, the higher processor has to identify the path for sending the program transmission record to each of the lower processors.

The path number allows the higher processor to distinguish one lower processor from the other lower processor having the same processor type as that of the one lower processor. For example, in FIG. 14, one path from the intermediate-level processor-B 20 to the low-level processor-$D_1$ $40_1$ are shown in a second row of the system configuration data table and another path from the intermediate-level processor-B 20 to the low-level processor-$D_2$ $40_2$ are shown in a third row of the table. Since both of the the low-level processor-$D_1$ $40_1$ and the low-level processor-$D_2$ $40_2$ have the same processor type 4, the configuration data for the former is assigned the path number of 1 and the latter is assigned the path number of 2 so as to be distinguished from each other. Therefore, even if the high-level processor-A 10 is not connected directly to either the low-level processor-$D_1$ $40_1$ nor processor-$D_2$ $40_2$, the high-level processor-A 10 can easily distinguish the low-level processor-$D_1$ $40_1$ from the low-level processor-$D_2$ $40_2$ on the basis of the path number.

A description will be given, with reference to FIG. 15, of block configuration data tables according to the second embodiment of the present invention. FIG. 15A shows the block configuration data table 22 created in the intermediate-level processor-B 20 and FIG. 15B shows the block configuration data table 32 created in the intermediate-level processor-C 30. The block configuration data tables 22 and 32 also contains data such as number of levels, path number, lower processor type, lower processor address, higher processor type and higher processor address in the same way as the system configuration data table, shown in FIG. 14.

A description will be given, with reference to FIG. 16, of a flow chart for explaining a down loading operation of a lower processor according to the second embodiment of the present invention. In the following description, the lower processor is assumed to be the intermediate-level processor-B 20, but the lower processor may be either an intermediate-level processor or a low-level processor.

The operation of the lower processor is very similar to that of the lower processor described above, with reference to FIG. 12.

The intermediate-level controller 24 of the intermediate-level processor-B 20 receives a program transmission record from the high-level processor-A 10 in S500. Then, the intermediate-level controller 24 determines whether an IPL processor type in the received program transmission record is equal to the intermediate-level processor-B's type in S510.

If the IPL processor type is equal to the intermediate-level processor-B's type, then the intermediate-level controller 24 extracts the program from the program transmission record and loads the extracted program into a memory in the intermediate-level processor-B 20 in S520. Then, the down loading operation of the intermediate-level controller 24 proceeds to S530.

If the IPL processor type is not equal to the intermediate-level processor-B's type, then the intermediate-level controller 24 searches the block configuration data table 24 for the processor having the type corresponding to the IPL processor type in S530. If the corresponding processor, for example, the low-level processor-$D_1$ $40_1$, is found, then the intermediate-level controller 24 modifies the received program transmission record as described above and sends the program transmission record to the low-level processor-$D_1$ $40_1$, in S540. Then, the intermediate-level controller 24 returns to S530 for finding further processors to be down loaded.

The operation of the lower processor according to the second embodiment of the present invention is characterized in that after the higher processor has loaded the received program in the memory in S520, if it is found in S530 that another processor having the same processor type as that of the higher processor is present at the lower hierarchical level, the higher processor sends the program transmission record to the lower processor in S540. Accordingly, if several lower processors having the same processor type are present at the lower hierarchical level in the system, the higher processor can send the program transmission record to all of the lower processors having the same processor type.

A description will be given, with reference to FIGS. 17A and 17B, of block configuration data tables according to a third embodiment of the present invention. FIG. 17A shows the block configuration data table 22 created in the intermediate-level processor-B 20 and FIG. 17B shows the block configuration data table 32 created in the intermediate-level processor-C 30. The block configuration data tables 22 and 32 contain data such as lower processor type, number of lower processors and lower processor addresses.

In this case, the number of processors represents the number of lower processors, connected directly to the intermediate-level processor including the block configuration data table, for each of the processor types. This structure of the block configuration data table has an advantage that it saves a larger memory capacity used for storing the block configuration data than that of the block configuration data table having the same structure as the system configuration data table.

Figure 18:
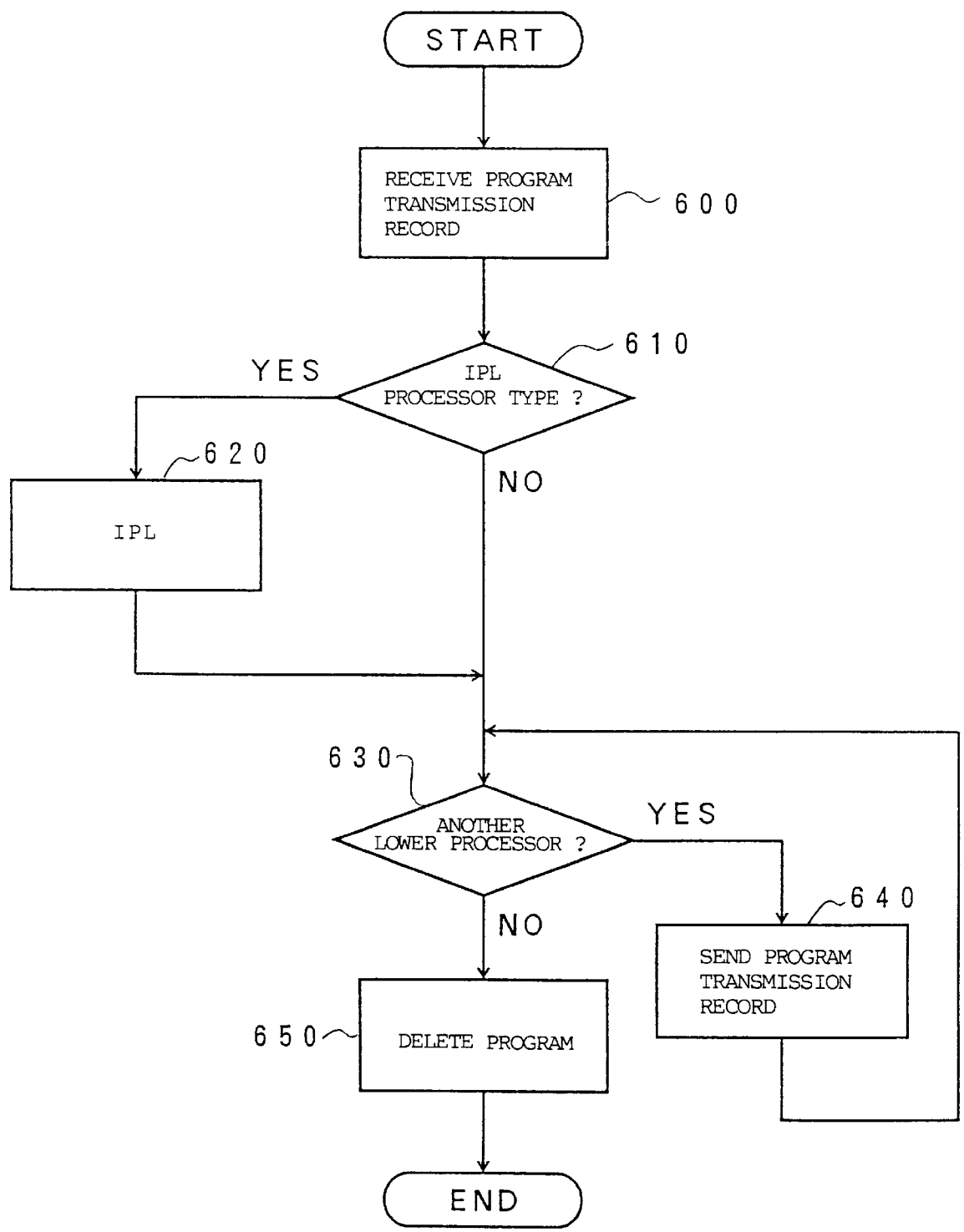
FIG. 18 shows a flow chart for explaining an operation of a lower processor for loading information according to the third embodiment of the present invention.

A description will be given, with reference to FIG. 18, of a flow chart for explaining a down loading operation of a lower processor according to the third embodiment of the present invention. In the following description, the lower processor is assumed to be the intermediate-level processor-B 20, but the lower processor may be either an intermediate-level processor or a low-level processor.

The operation of the lower processor is very similar to that of the lower processor described above, with reference to FIG. 16.

Figure 16:
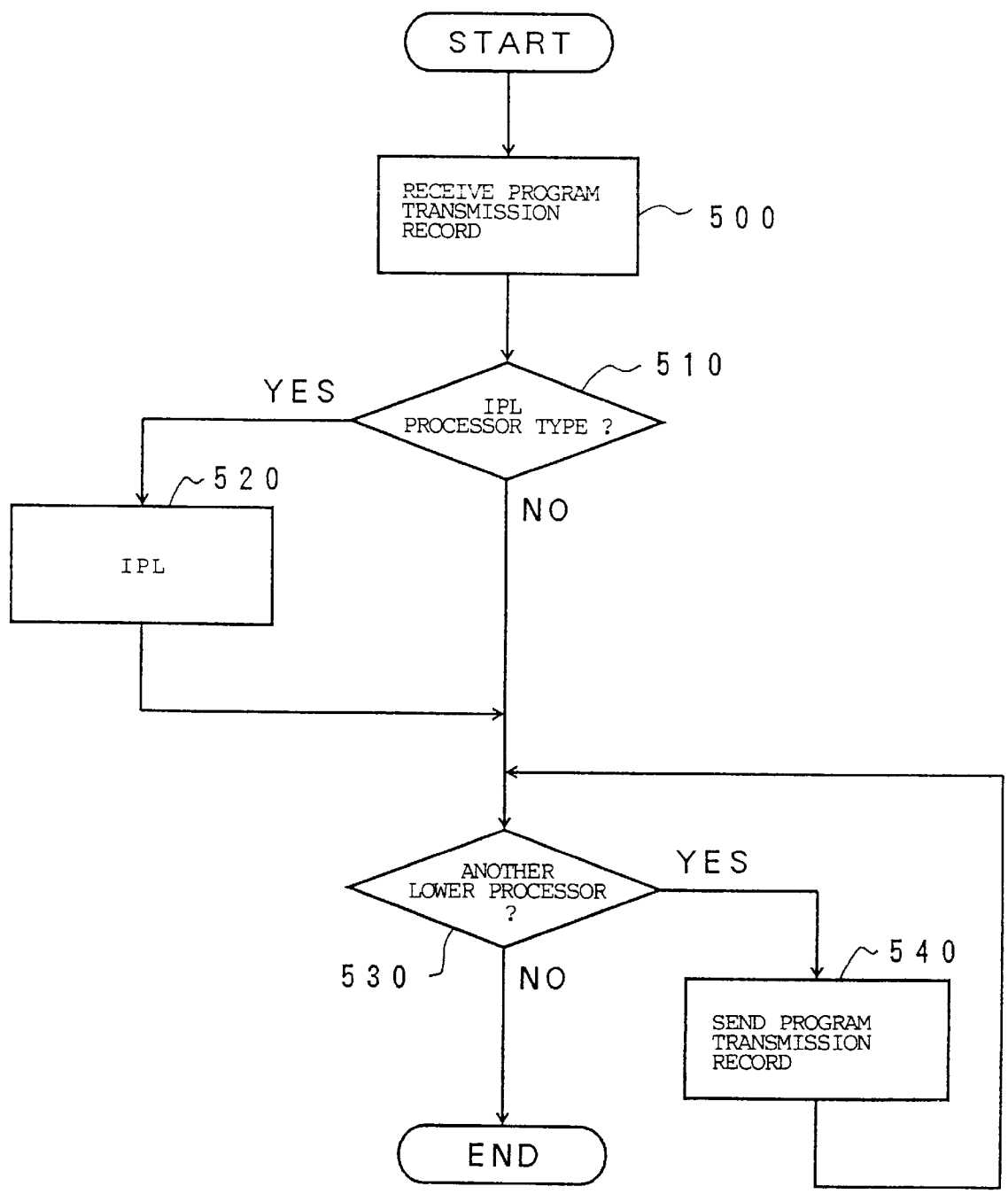
FIG. 16 shows a flow chart for explaining an operation of a lower processor for loading information according to the second embodiment of the present invention.

In this case, the steps 600 through 640 are corresponding to the steps 500 through 540, respectively, in FIG. 16. Therefore, it will be understood that the same operation is executed in each of the corresponding steps.

The operation of the lower processor according to the third embodiment of the present invention is characterized in that the lower processor deletes, in S650, a program transmission record received in S600. This deletion is executed only if it is found in S630 that there is no lower processors present at the lower hierarchical level. The deletion process has an advantage that a down loading process will not fail even if the program transmission record would be sent to a processor having no paths for transmitting the program transmission record. Furthermore, according to the above deletion process, the processor can advantageously deal with the program transmission record sent erroneously thereto.

Two applications of the distributed hierarchical processing system for down loading information are described below.

Figure 19:
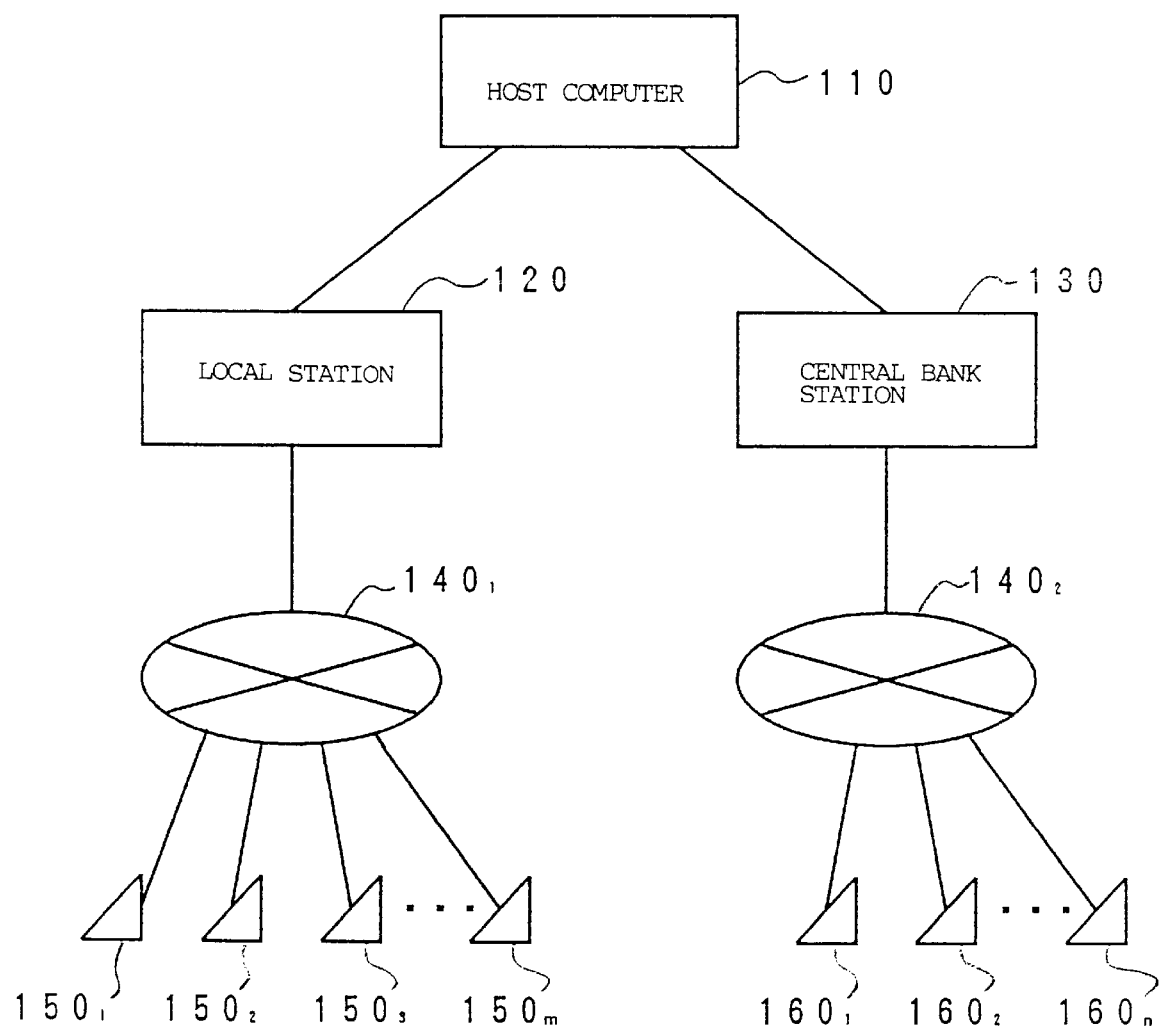
FIG. 19 illustrates a schematic diagram of an online network system according to a forth embodiment of the present invention.

First, a description will be given, with reference to FIG. 19, of an online network system according to a fourth embodiment of the present invention. In this case, programs or data are down loaded from a high-level processor to lower processors in the online network system.

The online network system comprises a host computer 110, a local station 120 connected to the host computer 110, a central bank station 130 connected to the host computer 110, a DDX-P(digital data exchange packet) network $140_1$ connected to the local station 120 and DDX-P network $140_2$ connected to the central bank station 130. The system further comprises local ATMs (automatic teller machines) $150_1$, $150_2$, . . , $150_m$ connected to the local station 120 via the DDX-P network $140_1$ and bank's ATMs $160_1$, $160_2$, . . . , $160_n$ connected to the central bank station 130 via the DDX-P network $140_2$. The distributed hierarchical processing system for down loading information can be efficiently applied to the online network system.

Figure 20:
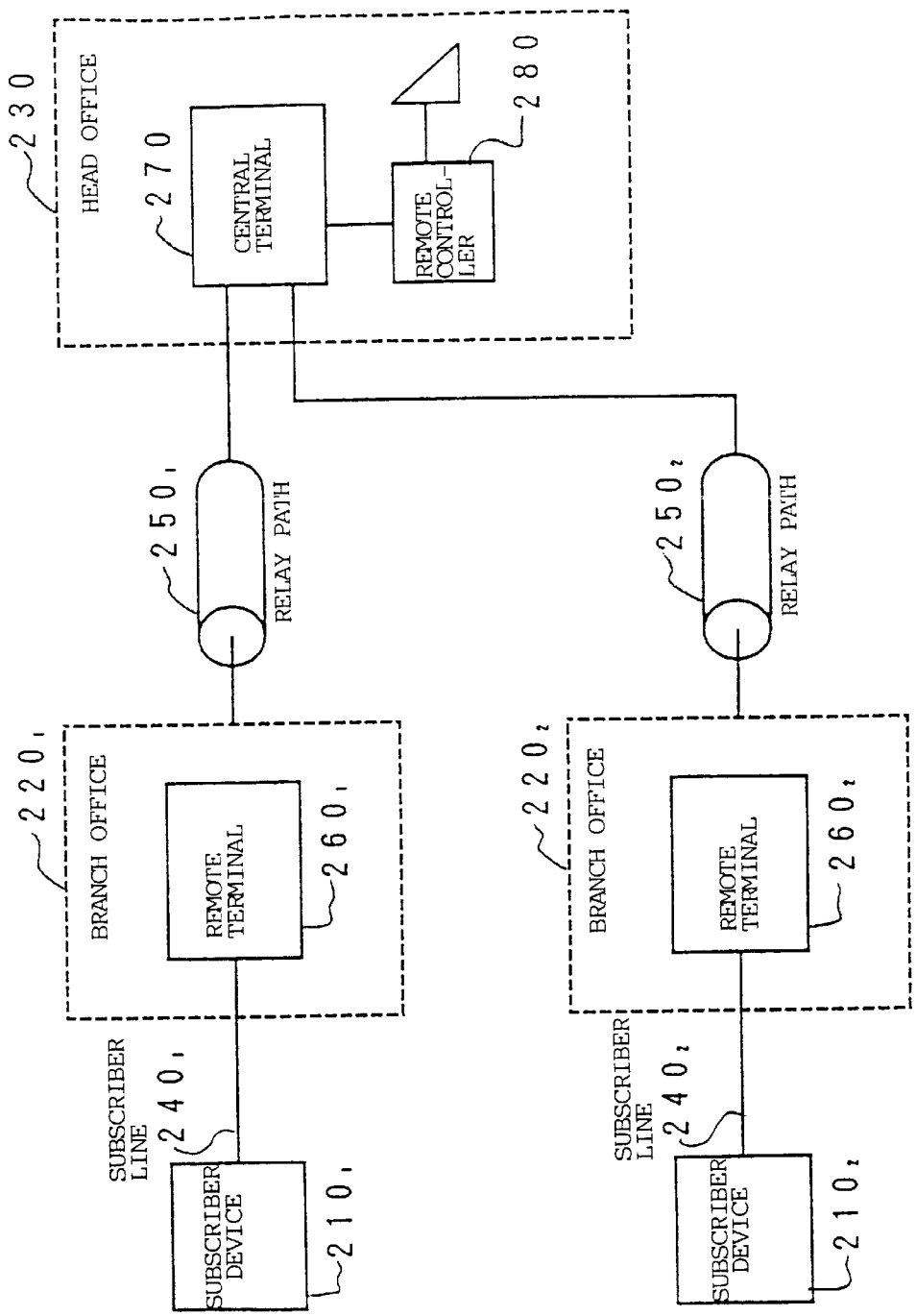
FIG. 20 illustrates a schematic diagram of a multiple transmission system for subscriber lines according to a fifth embodiment of the present invention.

Next, a description will be given, with reference to FIG. 20, of a multiple transmission system for subscriber's lines according to a fifth embodiment of the present invention.

The multiple transmission system comprises a remote controller 280, a central terminal 270, remote terminals $260_1$ and $260_2$ and subscriber devices $210_1$ and $210_2$. The multiple transmission system further comprises relay transmission paths $250_1$ and $250_2$ for connecting the central terminal 270 with the remote terminals $260_1$ and $260_2$, respectively, and subscriber lines $240_1$ and $240_2$ for connecting the remote terminals $260_1$ and $260_2$ with the subscriber devices $210_1$ and $210_2$, respectively. The remote controller 280 for controlling the central terminal 270 is connected to the central terminal 270.

For example, the central terminal 270 and the remote controller 280 can be placed in a head office 230 and the remote terminals $260_1$ and $260_2$ can be placed in branch offices $220_1$ and $220_2$, respectively.

According to the multiple transmission system, based on the distributed hierarchical processing system for down loading information, of the present invention, the remote controller 280 can down load information to the central terminal 270 and the remote terminals $260_1$ and $260_2$.

Further, the present invention is not limited to the above described embodiments, and variations and modifications may be made without departing from the scope of the present invention.

What is claimed is:

1. A hierarchical processing system including processors connected in a hierarchical formation having first, second and third hierarchical levels, said hierarchical processing system comprising:

first equipment, provided at the first hierarchical level, having memory stored information to be down loaded to the processors located at the second and third hierarchical levels, table stored configuration data representing addresses for sending said information to the processors located at the second and third hierarchical levels, and a first controller to send said information based on said configuration data;

second equipment, provided at the second hierarchical level, having a second controller to receive the information to be down loaded to the processors located at the second and third hierarchical levels from said first equipment and to send to the first equipment the configuration data representing addresses for sending said information to the processors located at the second and third hierarchical levels; and third equipment, provided at the third hierarchical level, having a third controller to receive the information to be down loaded to the processors located at the third hierarchical level from the first equipment via the second equipment and to send to the second equipment the configuration data representing addresses for sending said information to the processors located at the third hierarchical level, wherein the configuration data sent by the second equipment and the third equipment represents the type and the address for a source processor for sending the configuration data therefrom, the type and the address for a destination processor for receiving the configuration data thereto and the hierarchical level for the source processor;

wherein the third controller of the third equipment sets the type and the address for the processor located at the third hierarchical level to the type and the address, respectively, for the source processor in the configuration data and initializes the hierarchical level for the source processor in the configuration data with a prescribed value;

wherein the second controller of the second equipment determines whether the hierarchical level for the source processor in said configuration data is equal to the prescribed value, sets the type and the address for the processor located at the second hierarchical level to the type and the address for the source processor in the configuration data if the hierarchical level for the source processor in the configuration data is equal to the prescribed value, and raises the hierarchical level for the source processor in the configuration data by 1 level; and wherein the first controller of the first equipment further comprises;

equipment searching the stored configuration data in the system memory equipment for one processor located at the hierarchical level as low as possible so as to determine the processor to be down loaded thereto;

equipment selecting information to be down loaded to the determined processor in dependence on the determined processor; and equipment setting the type for the determined processor to the destination label added to the information to be down loaded to the determined processor and selecting the destination processor on the basis of the configuration data about the determined processor so that the information should be down loaded to the determined processor via the selected destination processor.

2. The hierarchical processing system as claimed in claim 1, wherein the first equipment is provided within one first-level processor which is one of the processors located at the first hierarchical level;

the second equipment is provided within at least one second-level processor which is one of the processors located at the second hierarchical level; and the third equipment is provided within at least one third-level processor which is one of the processors located at the third hierarchical level.

3. The hierarchical processing system as claimed in claim 2, wherein the first equipment further comprises:

memory equipment storing the memory stored information to be down loaded to the second-level and third-level processors; and system memory equipment storing the table stored configuration data about the second-level and third-level processors, wherein the first controller sends the stored information to the second-level processors on the basis of the stored configuration data representing addresses for sending said information to the second-level and third-level processors, and the configuration data also represents a type and an address for each of the second-level and third-level processors.

4. The hierarchical processing system as claimed in claim 3, wherein the first controller adds a destination label to the information to be down loaded to the second-level and third-level processors, the destination label specifying the processor to be down loaded;

the second equipment comprises equipment determining whether the information received from the first controller should be loaded in the second-level processor on the basis of the destination label added to the information; and the third equipment comprises equipment determining whether the information received from the second equipment should be loaded in the third-level processor on the basis of the destination label added to the information.

5. The hierarchical processing system as claimed in claim 4, wherein the first controller further comprises equipment successively selecting the processor located at the hierarchical level as low as possible so that the information to be down loaded to the second-level and third-level processors is sent to the second-level processor according to a sequence of the hierarchical levels corresponding to the selected processors.

6. The hierarchical processing system as claimed in claim 5, wherein the second equipment further comprise block memory equipment storing the configuration data for each collection of the processors having the same processor type, the configuration data being modified to contain the processor type, a number of the processors in the collection, and the address for each of the processors in the collection.

7. The hierarchical processing system as claimed in claim 6, wherein the second controller further comprises:

equipment loading the information received from the first-level processor in the second-level processor if the destination label added to the received information corresponds to the second-level processor; and equipment selecting one processor so that the information is down loaded to the processor corresponding to the destination label added to the information via the one selected processor if said destination label added to the information does not correspond to the second-level processor, and wherein the third controller further comprises:

equipment loading the information received from the second-level processor in the third-level processor if the destination label added to the received information corresponds to the third-level processor and deleting the information if the destination label does not correspond to the third-level processor.

8. The hierarchical processing system as claimed in claim 5, wherein the second equipment further comprises block memory equipment storing the configuration data received from the third-level processors.

9. The hierarchical processing system as claimed in claim 8, wherein the destination label added to the information to be down loaded to the second-level and third-level processors is the type of the selected processor to be down loaded.

10. The hierarchical processing system as claimed in claim 9, wherein the second controller further comprises:

equipment loading the information received from the first-level processor in the second-level processor if the destination label added to the received information corresponds to the second-level processor; and equipment selecting one processor so that the information is down loaded to the processor corresponding to the destination label added to the information via the one selected processor if said destination label added to the information does not correspond to the second-level processor, and wherein the third controller further comprises:

equipment loading the information received from the second-level processor in the third-level processor if the destination label added to the received information corresponds to the third-level processor.

11. The hierarchical processing system as claimed in claim 8, wherein the configuration data stored in the system memory equipment further contains a path number for each of the processors to distinguish one processor from other processors having the same processor type.

12. The hierarchical processing system as claimed in claim 11, wherein the configuration data stored in the block memory equipment further contains the path number for each of the processors to distinguish one processor from other processors having the same processor type.

13. The hierarchical processing system as claimed in claim 12, wherein the second controller further comprises:

equipment loading the information received from the first-level processor in the second-level processor and selecting one processor so that the information is down loaded to another processor corresponding to the destination label added to the information via the one selected possessor if the destination label added to the received information corresponds to the second-level processor; and equipment selecting one processor so that the information is down loaded to the processor corresponding to the destination label added to the information via the one selected processor if said destination label added to the information does not correspond to the second-level processor, and wherein the third controller further comprises:

equipment loading the information received from the second-level processor in the third-level processor if the destination label added to the received information corresponds to the third-level processor.

14. A method for down loading information in parallel to processors connected in a hierarchical formation having first, second and third hierarchical levels, the method comprising the steps of:

storing the information in a first processor located at the first hierarchical level;

setting a type and an address for each third processor located at the third hierarchical level to a type and an address, respectively, for a source processor in configuration data, said source processor sending configuration data therefrom and initializing a hierarchical level for the source processor in the configuration data with a predetermined value;

sending configuration data representing addresses for sending said information to third processors from the third processors to second processors located at the second hierarchical level;

determining whether the hierarchical level for the source processor in said configuration data is equal to the prescribed value, setting the type and the address for the second processor to the type and address for the source processor in the configuration data if the hierarchical level for the source processor in said configuration data is equal to the prescribed value, and raising the hierarchical level for the source processor in the configuration data by 1 level;

sending configuration data about the third and second processors from the second processors to the first processor and storing the configuration data in the first processor;

selecting successively the processor located at the hierarchical level as low as possible on the basis of the stored configuration data representing addresses for sending said information to the third and second processors, setting the type for the selected processor to a destination label added to the information to be downloaded to the selected processor and selecting a destination processor for receiving the configuration data thereto on the basis of the configuration data about the selected processor so that the information should be down loaded to the selected processor via the selected destination processor;

sending the information with a label representing the selected processor from the first processor to the second processor;

sending the information with the label representing the selected processor from the second processor to the third processor on the basis of the configuration data representing addresses for sending said information to the third processors; and loading the information with the label representing the selected processor in the second or third processor if the label is corresponding to the processor to which the information is sent.

\* \* \* \* \*